US010822814B2

(12) United States Patent
Telleria et al.

(10) Patent No.: US 10,822,814 B2
(45) Date of Patent: Nov. 3, 2020

(54) AUTOMATED DRYWALL MUDDING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Henrik Bennetsen, San Francisco, CA (US); Josephine Marie Pedersen, Martinez, CA (US); Jonathan B. Pompa, Long Beach, CA (US); Charlie Yan, San Francisco, CA (US); Alana G. R. Yoel, San Francisco, CA (US); Miles J. Flannery, San Francisco, CA (US); Henry Tonoyan, San Francisco, CA (US)

(73) Assignee: CANVAS CONSTRUCTION, INC., San Francisco, CA (US)

( * ) Notice: Subject to any disclaimer, the term of this patent is extended or adjusted under 35 U.S.C. 154(b) by 106 days.

(21) Appl. No.: 15/941,886

(22) Filed: Mar. 30, 2018

(65) Prior Publication Data

US 2018/0283015 A1 Oct. 4, 2018

Related U.S. Application Data

(60) Provisional application No. 62/480,172, filed on Mar. 31, 2017.

(51) Int. Cl.
*B05C 11/10* (2006.01)
*B05D 1/02* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
None
See application file for complete search history.

(56) References Cited

U.S. PATENT DOCUMENTS 2,088,542 A 7/1937 Westin
2,514,748 A 7/1950 Di Stefano
(Continued)

FOREIGN PATENT DOCUMENTS

CN 2883554 Y 3/2007
CN 202023345 U 11/2011
(Continued)

OTHER PUBLICATIONS

Forsberg, "A Construction Robot for Autonomous Plastering of Walls and Ceilings", 1997, Lulea Univ. of Technology, pp. 1-9 (Year: 1997).*

(Continued)

*Primary Examiner* — Mohammad Ali
*Assistant Examiner* — David Earl Ogg
(74) *Attorney, Agent, or Firm* — Davis Wright Tremaine LLP

(57) ABSTRACT

An automated drywalling system for applying joint compound or plaster to drywall pieces. The system includes a robotic arm and a mudding end effector coupled at a distal end of the robotic arm, the mudding end effector configured to apply joint compound or plaster to a target surface. The system can further include a computing device executing a computational planner that: generates instructions for driving the mudding end effector and robotic arm to perform at (Continued)

least one mudding task that includes applying joint compound or plaster, via the mudding the end effector, to one or more joints between a plurality of drywall pieces, the generating based at least in part on obtained target surface data; and drives the end effector and robotic arm to perform the at least one mudding task.

23 Claims, 21 Drawing Sheets

(51) Int. Cl.

| | | |
|---|---|---|
| B05D 3/04 | (2006.01) | |
| B05D 3/06 | (2006.01) | |
| B24B 55/06 | (2006.01) | |
| B25J 15/00 | (2006.01) | |
| E04B 1/76 | (2006.01) | |
| B05B 7/26 | (2006.01) | |
| B05C 3/18 | (2006.01) | |
| B05B 14/00 | (2018.01) | |
| B05B 7/24 | (2006.01) | |
| B05B 9/01 | (2006.01) | |
| B25J 9/00 | (2006.01) | |
| B26D 3/08 | (2006.01) | |
| E04F 21/02 | (2006.01) | |
| E04F 21/165 | (2006.01) | |
| E04F 21/18 | (2006.01) | |
| E04F 21/12 | (2006.01) | |
| B05B 1/28 | (2006.01) | |
| B05B 7/00 | (2006.01) | |
| B05B 15/625 | (2018.01) | |
| B05B 12/12 | (2006.01) | |
| B05B 9/00 | (2006.01) | |
| B25J 9/16 | (2006.01) | |
| B25J 11/00 | (2006.01) | |
| B26D 5/00 | (2006.01) | |
| E04F 21/08 | (2006.01) | |
| E04F 21/16 | (2006.01) | |
| B24B 7/18 | (2006.01) | |
| B24B 49/12 | (2006.01) | |
| B24B 55/10 | (2006.01) | |
| E04F 21/00 | (2006.01) | |
| B05C 5/00 | (2006.01) | |
| B05C 5/02 | (2006.01) | |

(52) U.S. Cl.
CPC .......... *B05B 12/122* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(56) References Cited

U.S. PATENT DOCUMENTS

| | | | |
|---|---|---|---|
| 3,116,882 A | 1/1964 | Vork | |
| 4,941,182 A | 7/1990 | Patel | |
| 5,175,018 A | 12/1992 | Lee et al. | |
| 5,279,700 A * | 1/1994 | Retti | E04F 21/165 |
| | | | 118/679 |
| 5,670,202 A | 9/1997 | Guzowski et al. | |
| 5,979,520 A | 11/1999 | Behrendt | |
| 6,112,490 A | 9/2000 | Meyer | |
| 6,149,506 A | 11/2000 | Duescher | |
| 6,712,238 B1 | 3/2004 | Mills | |
| 7,551,058 B1 | 6/2009 | Johnson et al. | |
| 9,518,870 B2 * | 12/2016 | Verdino | G01K 1/024 |
| 9,527,211 B2 | 12/2016 | Posselius et al. | |
| 9,694,381 B2 * | 7/2017 | Mohr | B05C 17/00589 |
| 9,702,830 B1 | 7/2017 | Akselrod et al. | |
| 9,849,594 B2 | 12/2017 | Keese | |
| 9,995,047 B2 * | 6/2018 | Raman | E04F 21/1872 |
| 2004/0159724 A1 | 8/2004 | van der Steur | |
| 2005/0120840 A1 | 6/2005 | Koskovich | |
| 2006/0108450 A1 | 5/2006 | Klinkenberg et al. | |
| 2007/0000947 A1 | 1/2007 | Lewis et al. | |
| 2007/0107632 A1 * | 5/2007 | Ball | C08K 5/0041 |
| | | | 106/287.24 |
| 2007/0151201 A1 | 7/2007 | Fellinger | |
| 2009/0199690 A1 | 8/2009 | Sun et al. | |
| 2010/0010660 A1 | 1/2010 | Salour et al. | |
| 2011/0011222 A1 | 1/2011 | Bales | |
| 2011/0211938 A1 | 9/2011 | Eakins et al. | |
| 2011/0253291 A1 | 10/2011 | Allen et al. | |
| 2012/0219699 A1 | 8/2012 | Pettersson et al. | |
| 2013/0167471 A1 | 7/2013 | Denaro | |
| 2013/0260016 A1 | 10/2013 | Georgeson et al. | |
| 2014/0022281 A1 | 1/2014 | Georgeson et al. | |
| 2014/0230726 A1 | 8/2014 | Gale et al. | |
| 2015/0112482 A1 | 4/2015 | Kuwahara | |
| 2015/0147460 A1 | 5/2015 | Manzi et al. | |
| 2015/0336267 A1 | 11/2015 | Sun et al. | |
| 2015/0350618 A1 | 12/2015 | Meier et al. | |
| 2016/0052012 A1 | 2/2016 | Mohr | |
| 2016/0121486 A1 * | 5/2016 | Lipinski | B05B 13/005 |
| | | | 427/427.3 |
| 2016/0313294 A1 | 10/2016 | Dattilo et al. | |
| 2017/0052507 A1 | 2/2017 | Poulos et al. | |
| 2018/0009000 A1 | 1/2018 | Shang et al. | |
| 2018/0021799 A1 * | 1/2018 | Raman | B05B 14/30 |
| | | | 427/294 |
| 2019/0118209 A1 | 4/2019 | Rennuit | |

FOREIGN PATENT DOCUMENTS

| | | |
|---|---|---|
| CN | 105971253 A | 9/2016 |
| CN | 106088544 A | 11/2016 |
| DE | 102006056179 A1 | 6/2008 |
| JP | H03100265 A | 4/1991 |
| JP | H04169659 A | 6/1992 |
| JP | H10180178 A | 7/1998 |
| RU | 1789711 C | 1/1993 |
| RU | 2100686 C1 | 12/1997 |
| SU | 00160667 | 11/1963 |
| WO | 2013000524 A1 | 1/2013 |
| WO | 2016200439 A1 | 12/2016 |
| WO | 2018183961 A1 | 10/2018 |
| WO | 2018226533 A1 | 12/2018 |

OTHER PUBLICATIONS

"Walls and Ceilings Joint Compund Additive", Jun. 5, 2012, Tuberville Enterprizes LLC, pp. 1 (Year: 2012).*

(56) References Cited

OTHER PUBLICATIONS

Fanuc, "Robotic Sanding, Washing & Drying An Aircraft Fuselage with FANUC's New P-350iA/45 Robot", Oct 27, 2016, Fanuc America Corp, pp. 1-4 (Year: 2016).*
Bao et al., "Flexible Pneumatic End-effector for Agricultural Robot: Design & Experiment," Proceedings of the 2015 IEEE Conference on Robotics and Biomimetics, Dec. 6, 2015, 6 pages.
Fanuc America Corporation, "Robotic Sanding, Washing & Drying An Aircraft Fuselage with FANUC's New P-350iA/45 Robot," Oct. 27, 2018, retrieved from https://www.youtube.com/watch?v=abA9v8EOokl, 4 pages.
International Search Report and Written Opinion dated Aug. 2, 2018, International Patent Application No. PCT/US2018/025570, filed Mar. 30, 2018, 7 pages.
International Search Report and Written Opinion dated Jul. 5, 2018, International Patent Application No. PCT/US2018/025529, filed Mar. 30, 2018, 7 pages.
International Search Report and Written Opinion dated Jul. 5, 2018, International Patent Application No. PCT/US2018/025536, filed Mar. 30, 2018, 7 pages.
International Search Report and Written Opinion dated Jul. 5, 2018, International Patent Application No. PCT/US2018/025553, filed Mar. 30, 2018, 7 pages.
International Search Report and Written Opinion dated Jul. 5, 2018, International Patent Application No. PCT/US2018/025556, filed Mar. 30, 2018, 7 pages.
International Search Report and Written Opinion dated Jul. 5, 2018, International Patent Application No. PCT/US2018/025566, filed Mar. 30, 2018, 7 pages.
International Search Report and Written Opinion dated Feb. 28, 2019, International Patent Application No. PCT/US2018/052751, filed Sep. 25, 2018, 7 pages.
Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.
Nagata et al., "Robotic sanding system for new designed furniture with free-formed surface," Robotics and Computer-Integrated Manufacturing 23(4):371-379, Aug. 2007.
International Search Report and Written Opinion dated May 28, 2020, in International Patent Application No. PCT/US2020/019347, filed Feb. 21, 2020, 9 pages.

* cited by examiner

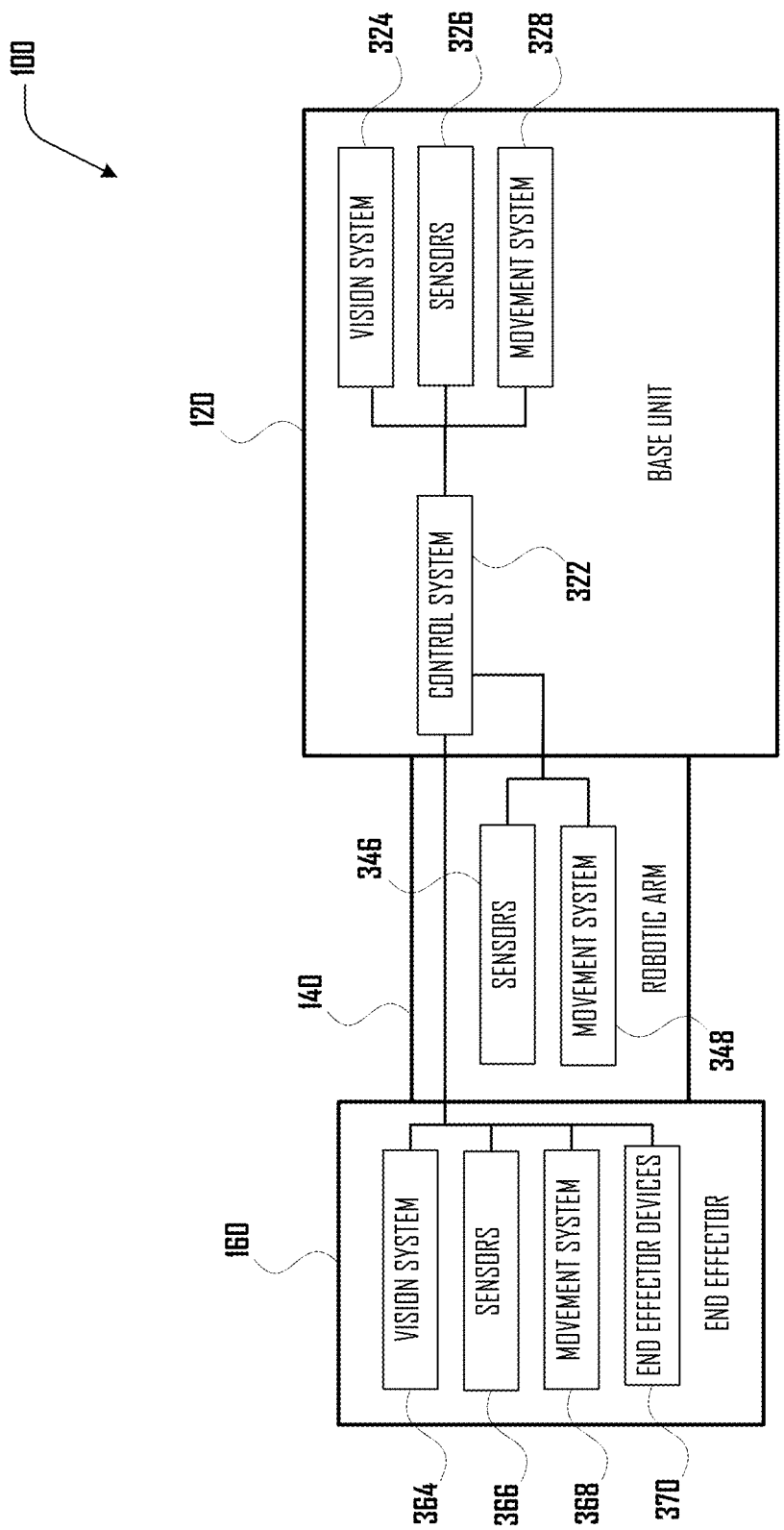

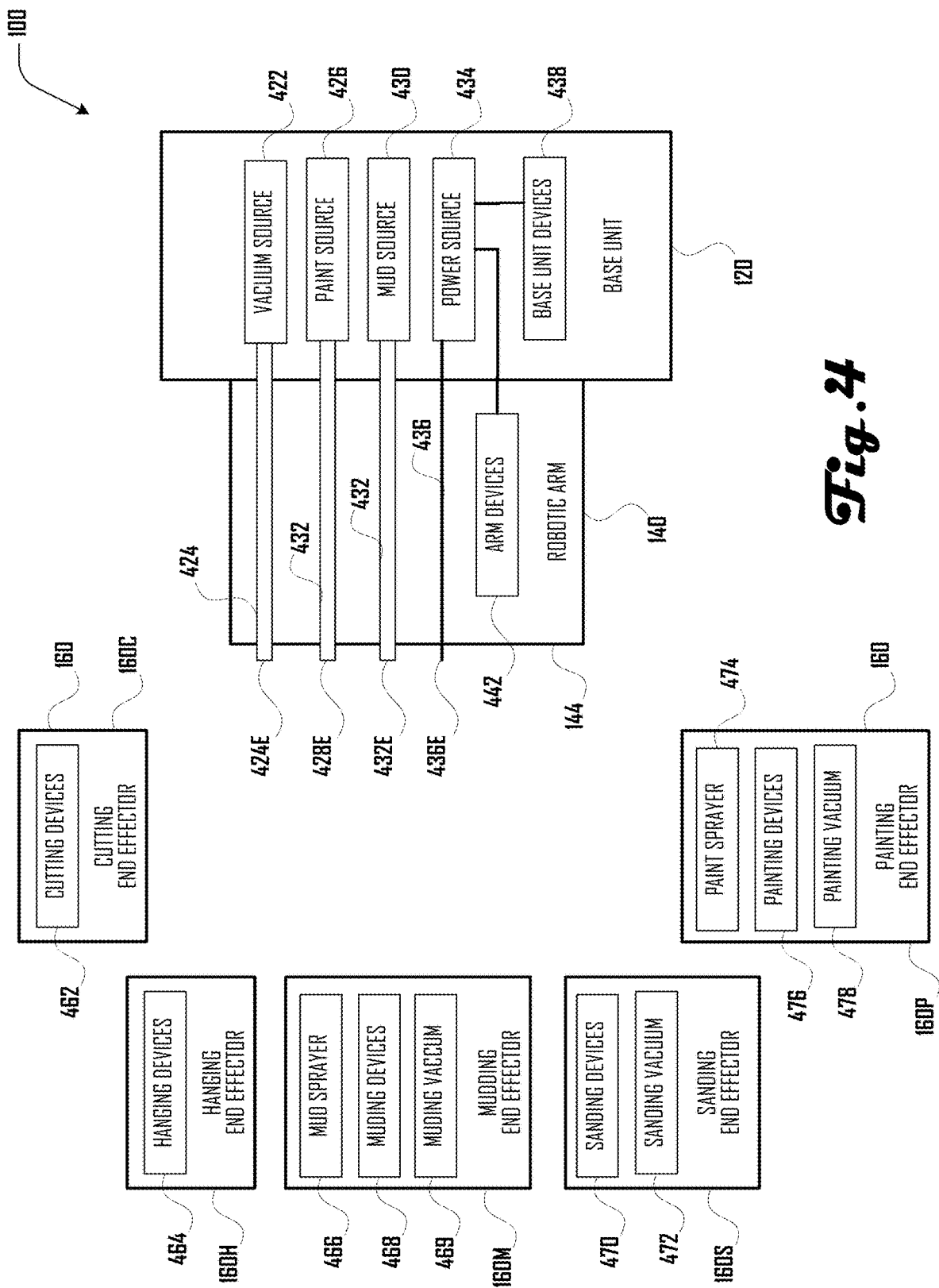

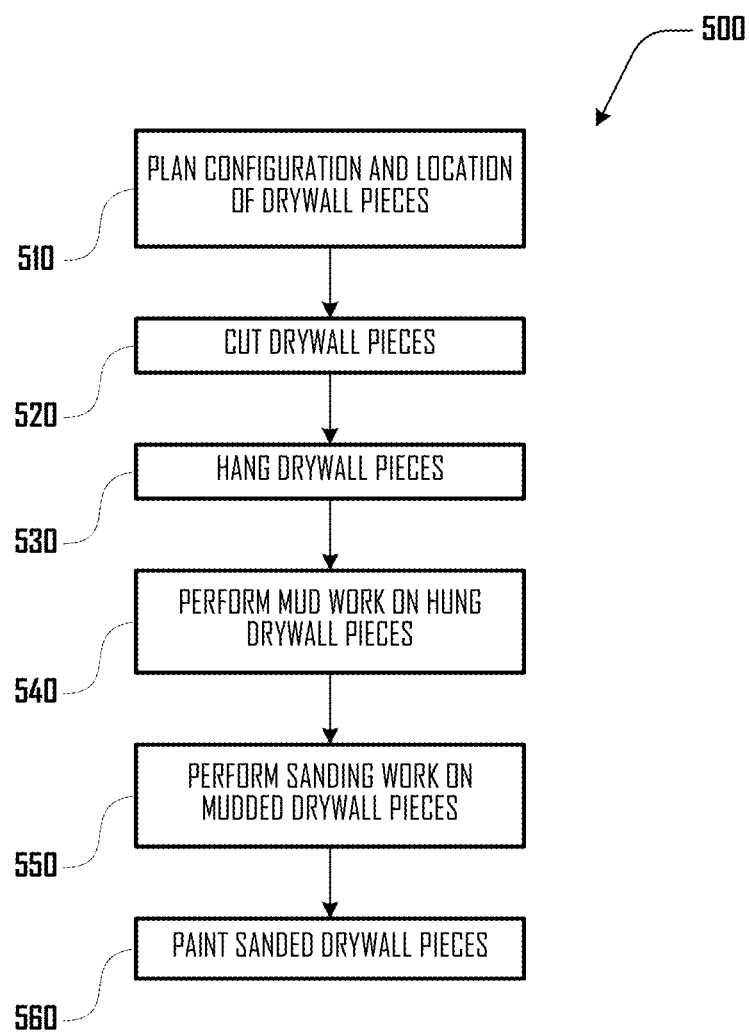

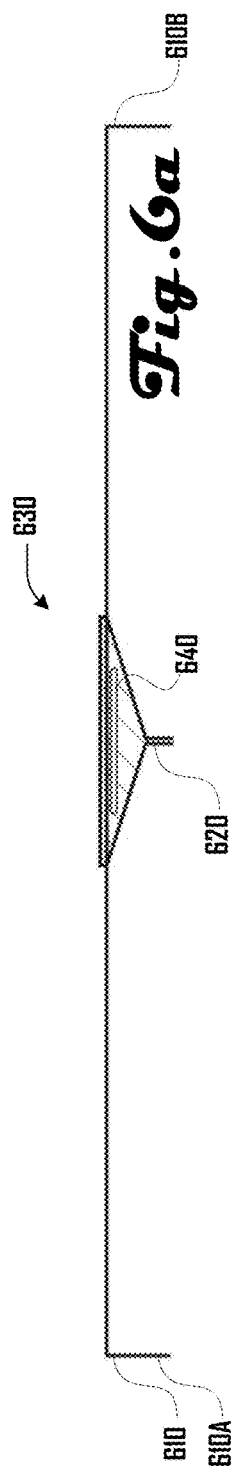
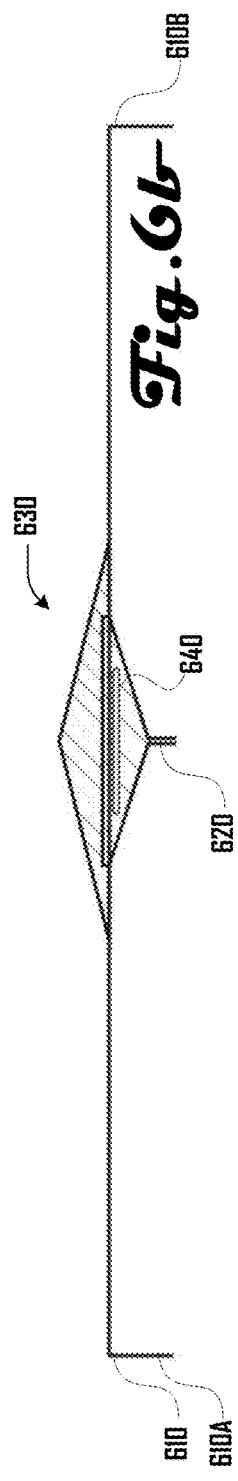
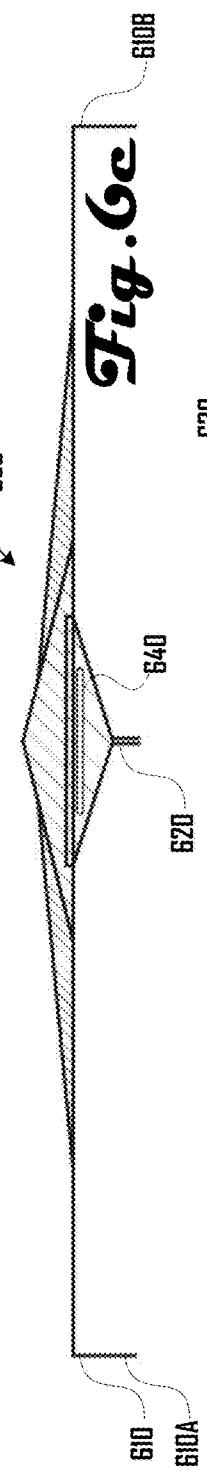
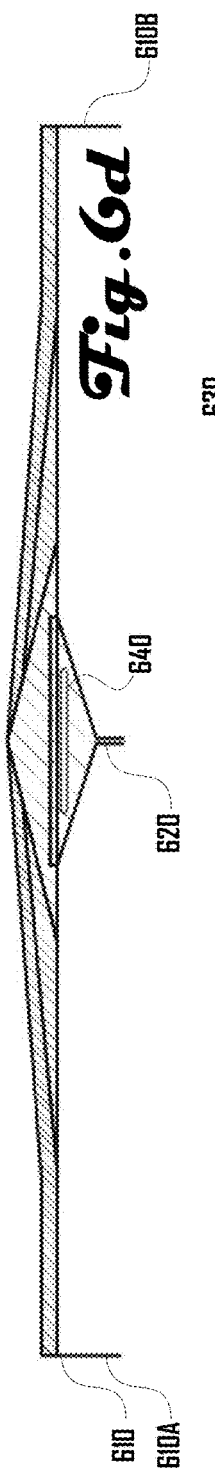
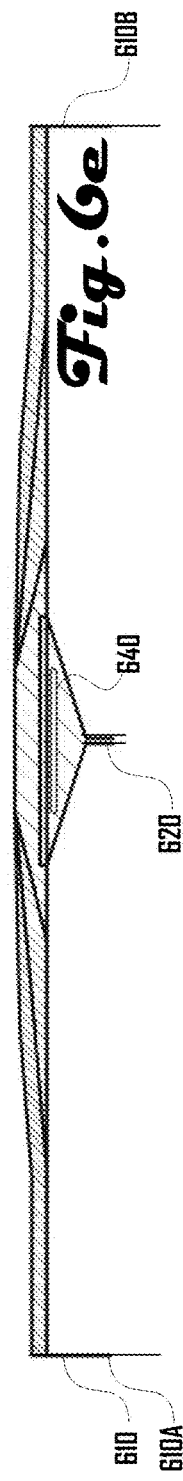

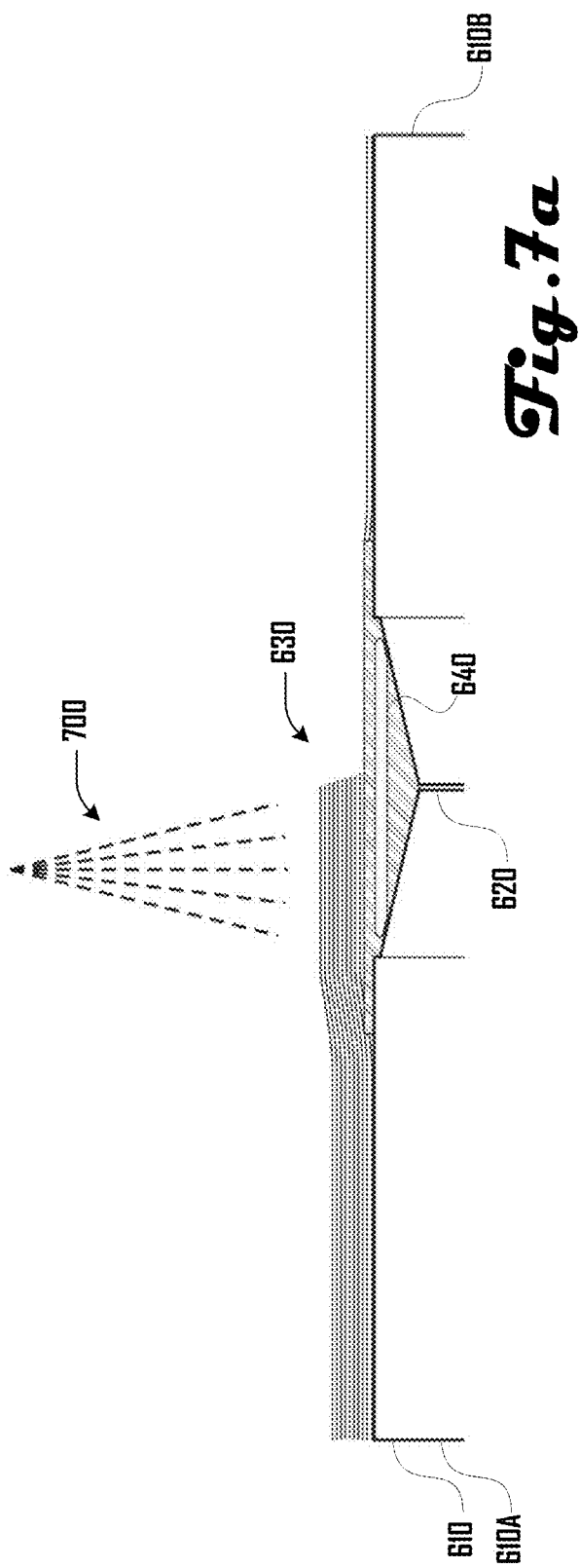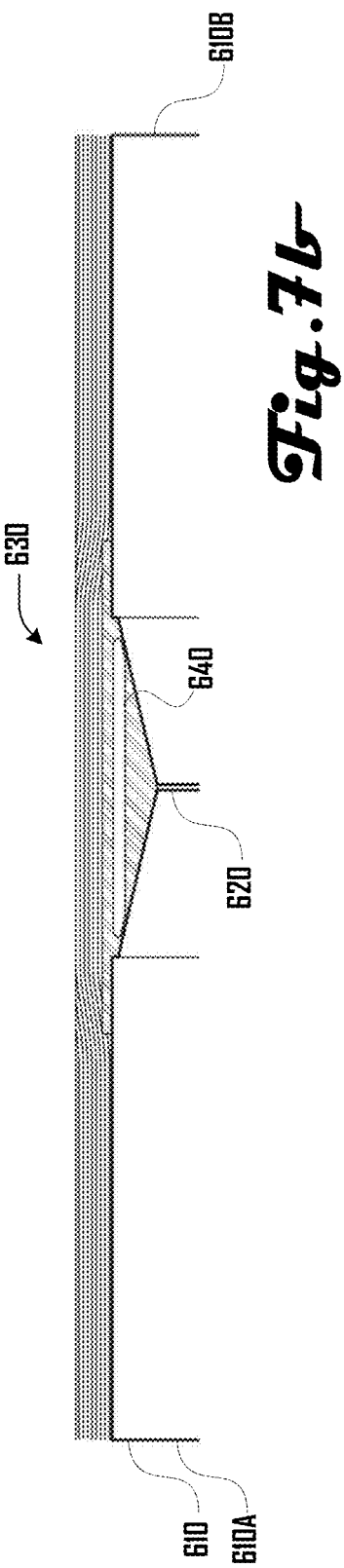

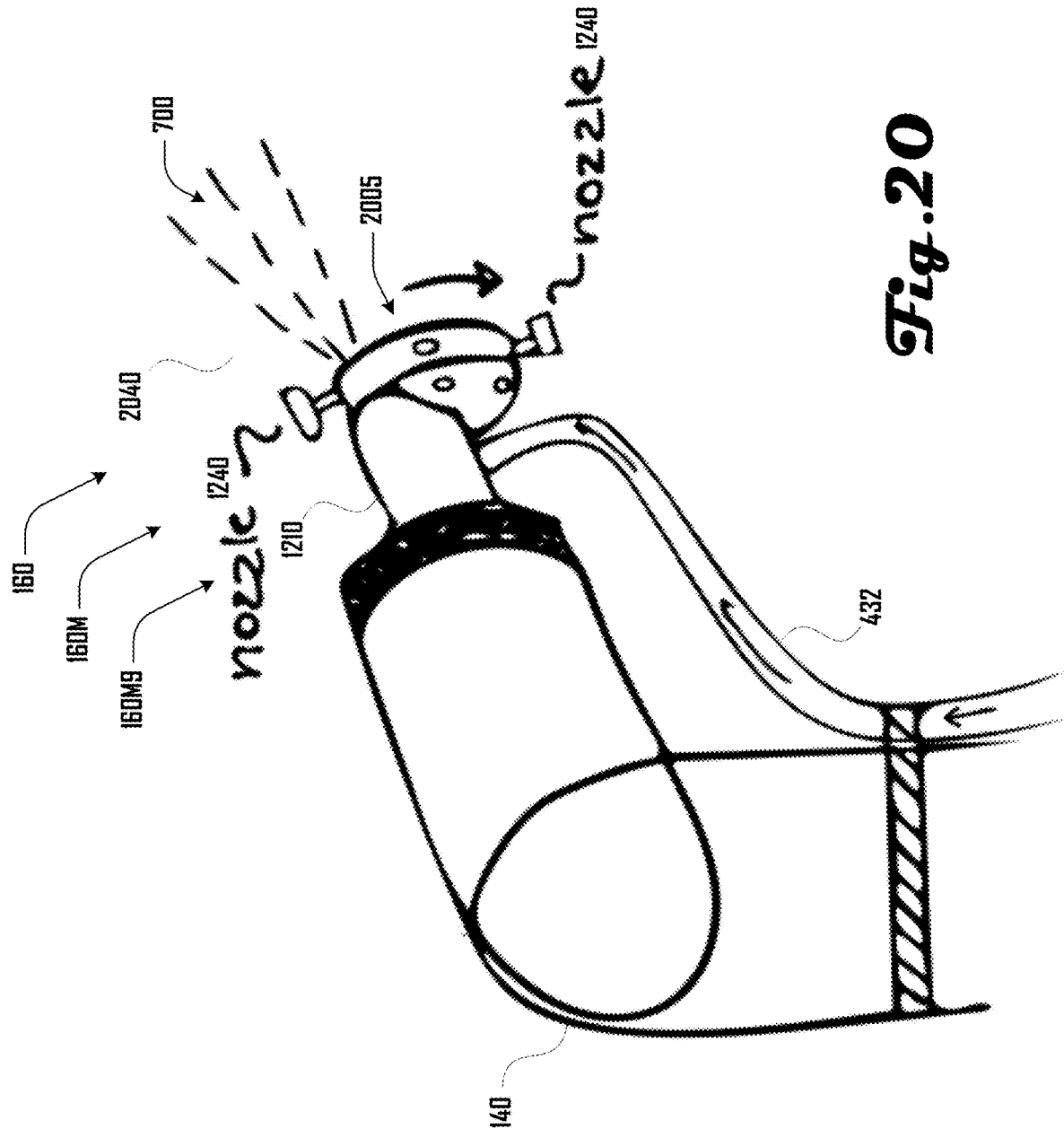

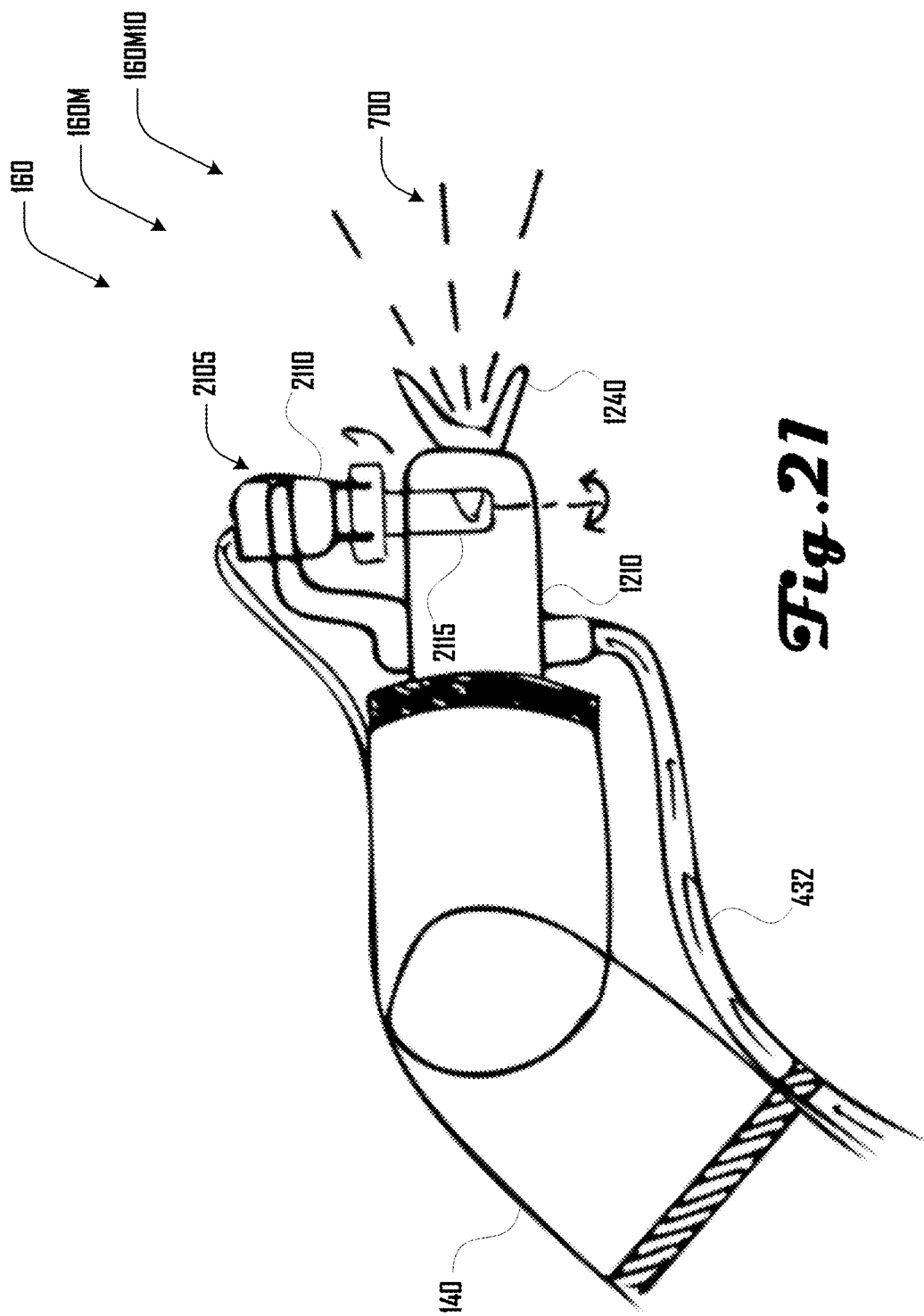

AUTOMATED DRYWALL MUDDING SYSTEM AND METHOD

CROSS-REFERENCE TO RELATED APPLICATIONS

This application is a non-provisional of, and claims the benefit of U.S. Provisional Application No. 62/480,172, filed Mar. 31, 2017, which application is hereby incorporated herein by reference in its entirety and for all purposes.

This application is also related to U.S. Non-provisional applications filed contemporaneously herewith having, respective application Ser. Nos. 15/942,158, 15/948,193, 15/942,318, 15/942087, 15/942,286 and 15/941,974 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL SANDING SYSTEM AND METHOD," "AUTOMATED DRYWALL PAINTING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIG. 3 is an exemplary block diagram illustrating systems of an automated drywalling system in accordance with one embodiment.

FIG. 4 is an exemplary block diagram illustrating systems of an automated drywalling system in accordance with one embodiment, including a plurality of end effectors configured to couple to an end of a robotic arm.

FIG. 5 illustrates a block diagram of method of installing drywall in accordance with one embodiment.

FIGS. 6a, 6b, 6c, 6d and 6e illustrate an embodiment of a manual mud application profile, where joint compound is applied over consecutive layers to taper out high points over a wider area and where sanding is then used to smooth out the final profile.

FIGS. 7a and 7b illustrate an embodiment of an automated compound application process where the joint compound is applied in a thick layer using a sprayer.

FIG. 15 illustrates an example embodiment of a mudding end effector that includes a spray pattern detection mechanism, in which a vision system can be used to monitor the pattern of mud spray coming out of the nozzle to detect clogs, nozzle wear, low pressure, or other problems with the spray gun or related system such as mud lines, mud source or the like.

FIG. 20 illustrates an example embodiment of a mudding end effector, which comprises a nozzle cassette system where a cassette of nozzles is attached to the end of the spray gun.

FIG. 21 illustrates another example embodiment of a mudding end effector that comprises a nozzle rotating system that can be part of a spray gun.

Figure 1:
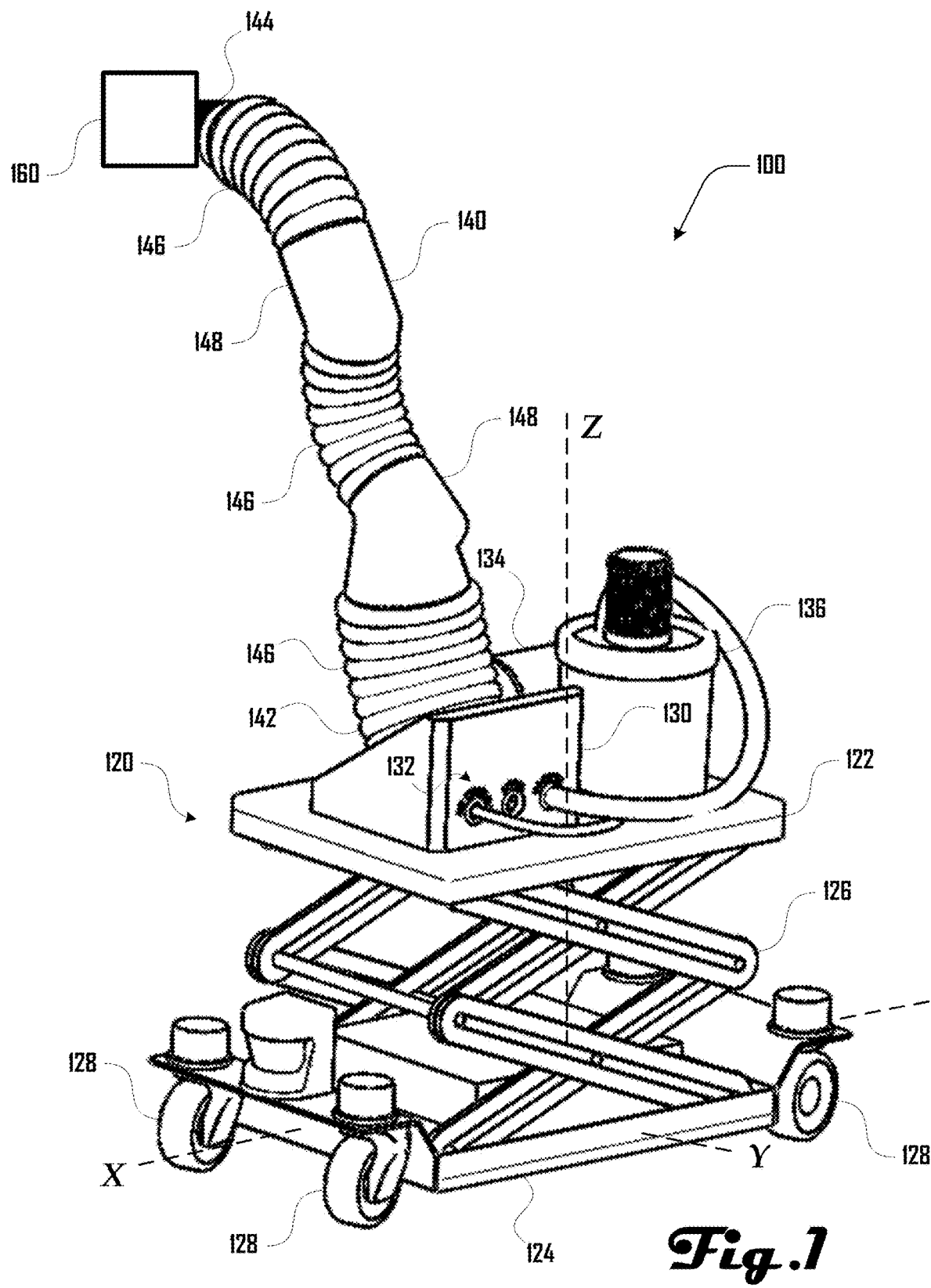
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

One aspect pertains to systems and methods for automated mixing, delivering, applying, curing, and/or drying coatings onto a substrate. In one embodiment, an automated drywalling system can be used to mix, deliver, apply, and dry joint compound on drywall boards. The automated drywalling system can be used to apply tape on seams between boards, apply joint compound or plaster onto the tape and boards, expedite the drying process, or any combination of these processes. The automated drywalling system can also be used to apply the joint tape and compound and achieve any level of drywall finish including between level 0 and level 5. The automated drywalling system can utilize joint compound known as mud or setting type compound also known as hot mud. Joint compound as discussed herein can encompass pre-mixed, topping, taping, multi-use, all-purpose, and setting type compounds. The automated drywalling system can also be used with other coatings including plaster, cement, stucco, and paint applied onto drywall, lath, mesh or another suitable substrate. The automated drywalling system can cover how the coating is prepared, how it is delivered onto the substrate and how it is set, cured or dried.

Figure 2:
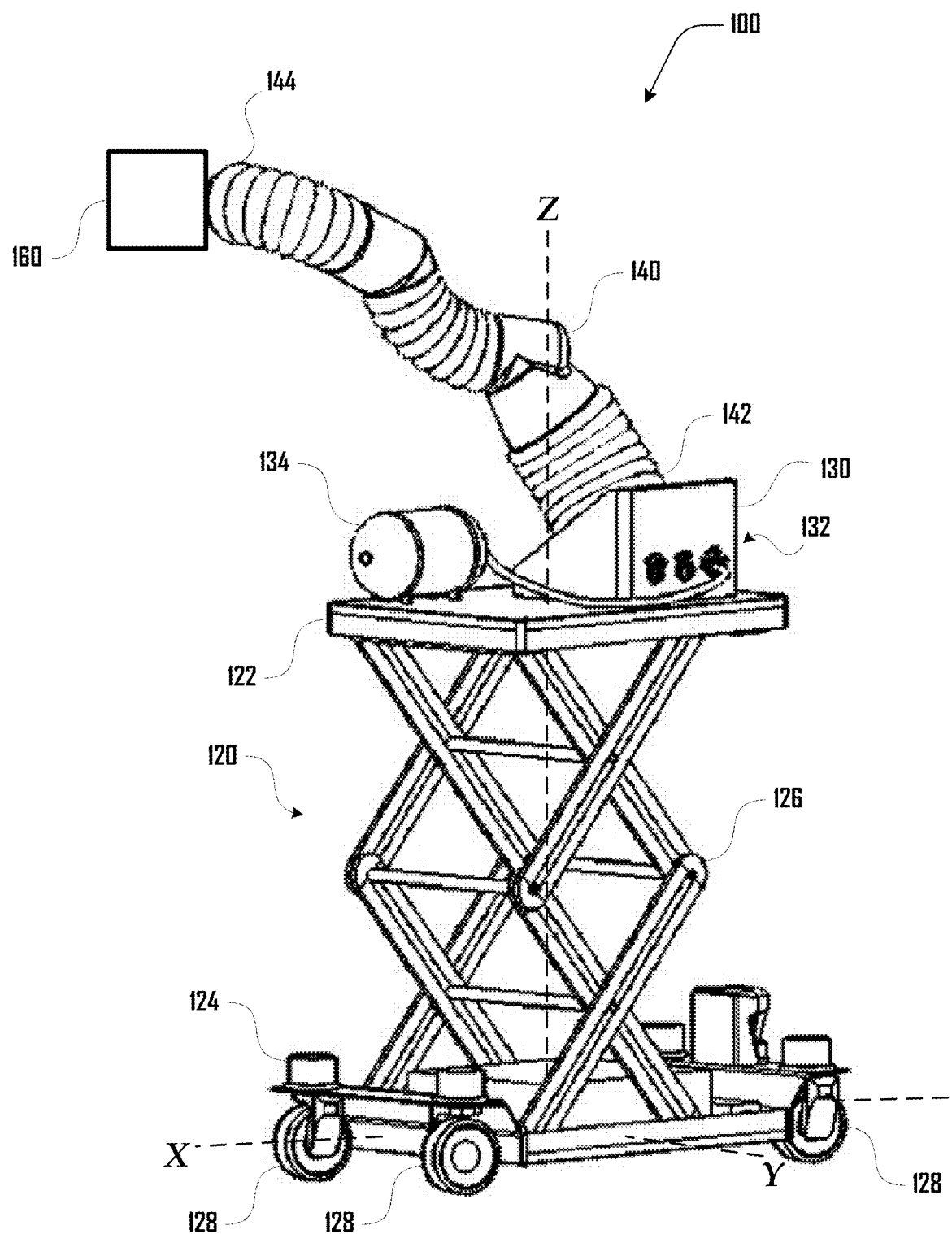
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or can be non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2 illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiments, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 may be used for.

As discussed in more detail herein, the control system 322 can receive data from the vision systems 324, 364 and sensors 326, 346, 366 and can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processor, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and or end effector 160.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S and a painting end effector 160P.

As shown in FIG. 4, the base unit 120 can comprise a vacuum source 422, a paint source 426, a mud source 430, a power source 432, and one or more base unit devices 438. In various embodiments, one or more of the vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batteries, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to installing and finishing drywall in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S and painting end effector 160P can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated drywalling system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for mud work, sanding and painting. Accordingly, the example of FIG. 4 should not be construed to be limiting on the wide variety of other embodiments that are within the scope and spirit of the present disclosure.

Turning to FIG. 5, a method 500 of drywalling is illustrated, which can be performed in whole or in part by an automated drywalling system 100 as discussed herein. The example method 500 or portions thereof can be performed automatically by the automated drywalling system 100 with or without user interaction.

The method 500 begins at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings, and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples, a hanging end effector 160H can be used for such drywall hanging.

At 540, mud work can be performed on the pieces of hung drywall. For example, joint compound (known also as "mud") can be applied to seams or joints between adjacent pieces of drywall, over surfaces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

In one aspect, the present disclosure pertains to systems and methods for automated mixing, delivering, applying, curing, and/or drying coatings onto a substrate. In one embodiment, an automated drywalling system 100 can be used to mix, deliver, apply, and dry joint compound on drywall boards. The automated drywalling system 100 can be used to apply tape on seams between boards, apply joint compound or plaster onto the tape and boards, expedite the drying process, or any combination of these processes. The automated drywalling system 100 can also be used to apply the joint tape and compound and achieve any level of drywall finish including between level 0 and level 5. The automated drywalling system 100 can utilize joint compound known as mud or setting type compound also known as hot mud. Joint compound as discussed herein can encompass pre-mixed, topping, taping, multi-use and all-purpose compounds. The automated drywalling system 100 can also be used with other coatings including plaster, cement, stucco, and paint applied onto drywall, lath, mesh or another suitable substrate. The automated drywalling system 100 can cover how the coating is prepared, how it is delivered onto the substrate and how it is set, cured or dried.

The automated drywalling system 100 can include humidity, temperature, air flow sensors, or the like, to establish environmental conditions for a task. Such sensors can comprise sensors 326, 346, 366 of a base unit 120, robotic arm 140 and/or end effector 160 of the automated drywalling system 100 (see, e.g., FIG. 3). An automated coating system can utilize these environmental sensors to determine optimal joint compound mixture ratios, set path parameters such as feed speed, thickness of mud applied, blade profiles and pressures, and sprayer settings. The environmental information in conjunction with the joint compound parameters can be used to determine or estimate drying and setting times for the mud allowing the automated drywalling system 100 to plan when a next step should begin.

The automated drywalling system 100 can also determine when the joint compound has set and dried by measuring the moisture content, thermal conductivity of the covered seam, using a thermal imaging camera or thermometer (contact or non-contact), detecting differences in colors using a camera, or the like. Thermal measurements can be used to infer the moisture content by comparing the temperature of the joint compound to the surrounding materials, and as the water evaporates from the mixture, the temperature of the compound can be lower than that of the surrounding materials.

Models of the joint compound drying process can also be used to estimate the time to dry or cure given a set of starting conditions and information about the environment. Similarly, the models of the joint compound in combination with environmental and substrate information can be used to estimate the drying shrinkage of the joint compound.

Environmental sensors can be used in conjunction with an HVAC system, heater, air conditioner, fans, or the like, to control the room conditions. The sensor readings can trigger any of these systems or a combination to maintain the room at the desired conditions for quality, reduced drying or setting time, or comfort of the operator. In some embodiments, such environmental control systems can be a part of the automated drywalling system 100 or can be located external to the automated drywalling system 100 including environmental controls systems of a worksite. Accordingly, in various embodiments, the automated drywalling system 100 can be configured to control environmental control systems that are a part of or external to the automated drywalling system 100, including via wired and/or wireless communication.

A mudding system can comprise of a variety of tools that enable the mudding system to mix, deliver, apply, smooth, dry, cure a coating of mud, or any combination of these. Such tools can be positioned and controlled using a robotic manipulator, positioning stage, gantry or any combination of these. A single end effector 160 or any multitude of end effectors 160 can be used to complete the task through coordinated or individual paths. The robotic arms 140 or tool stages can be moved around the room using a mobile base unit 120 that can be powered or moved manually by an operator. For example, in some embodiments a mudding system of an automated drywall system 100 can include one or more mudding end effector 160M, and elements associate with the base unit 120, including a mud source 430 (see FIG. 4).

The mobile base unit 120, one or more end effectors 160 and/or one or more robotic arms 140 can include sensors (e.g., sensors 326, 346, 366 as discussed in FIG. 3) to ensure safe operation next to the user. Safety sensors can include but are not limited to laser curtains, proximity sensors, force and torque sensors, pressure sensors, limit switches, or the like. Additionally, the automated drywall system 100 can include systems to track location of one or more user relative to end effector 160, robotic arm 140 and/or mobile base unit 120, including speed limiters and/or vision systems, such as LIDAR, radar, sonar, or any combination of these (for example, vision systems 324, 364 of FIG. 3).

As discussed herein, the mobile base 120 can include a vertical lift 126 that can be powered or unpowered. The vertical lift 126 can be used to lift or lower the robotic arm 140, end effector 160 and portions of a mudding system, which can be disposed on the end effector 160, platform 122, a gantry or the like. The lift can be instrumented with a position sensor that can be used to capture and control the height of the lift 126. For example such a sensor can comprise the sensors 326 as illustrated in FIG. 3.

Elements of mudding system of the automated drywalling system 100 can be controlled using the control system 322 that takes a variety of inputs (e.g., from sensors 326, 346, 366 and/or vision systems 324, 364) to determine tool paths and/or tool parameters for the platform 122 relative to the cart 124, robotic arm 140, and mudding devices 468 and or mud applicator 466 of a mudding end effector 160M, which are required to achieve desired mud coating characteristics.

In various embodiments, the automated drywall system 100 can create a map of the target surfaces such as pieces of drywall, joints between pieces of drywall, and the like. This map or model can be created by importing building information modeling (BIM) and/or 2D, 3D plans into a planner system. The map can be created directly by the system by utilizing computer vision or mapping sensors to scan the room (e.g., the automated drywall system 100). The scanning technologies can include, and suitable devices including stereo cameras, structured light cameras, LIDAR, radar, sonar, laser scanners, thermal imaging or any combination of these components. For example, in some embodiments, such scanning or vision systems can comprise the vision systems 324, 364

Uploaded 3D or 2D plans can be combined with field data to create a more accurate map of the environment in some examples. The data from different sources can be combined using key features and user input. The map can include the location of framing studs, drywall joints, openings, protrusions, as well as pipes, electrical conduit, ventilation ducts, and any other components installed on the walls or ceilings. These locations may have been derived from the uploaded plans, the room scan, user inputs, and the like. To facilitate the creation of the map, a user can help identify features through analysis of images, tagging of the features physically or digitally. The user can physically tag components using various suitable methods, including but not limited to, a laser, tags, markers or a combination of these. The scanning or vision system can pick up these tags or track them as the user moves around the room and locates the features. The mapping system or planner can also take as an input a layout of how the drywall boards were hung in the room to locate seams. This layout can be an input from the automated drywalling system 100 or a system that is separate from the automated drywalling system. The location of framing, type of anchors used and layout of the drywall can provide information on the planarity, flatness of the wall, and location of high or low points, which can be used determine tool paths and tool parameters.

The automated drywalling system 100 can include a computational planner (e.g., implemented by the control system 322 of the base unit 100) which can utilize a map uploaded to the system 100 or created by the system 100 to determine tool paths and/or tool parameters to achieve a desired coating application. The planner can create toolpaths off a global map of a room and then update these paths given updated local measurements once the end effector 160, robotic arm 140, and/or mobile base 120 are in place. The planner can be informed by vision system data (e.g. obtained by one or both of vision systems 324, 364) on the flatness of the wall, user inputs, location of seams as specified by a layout planner or a scan of the room after the substrate was applied. The planner can determine toolpaths and/or tool parameters to enable the automated drywalling system 100 to apply joint compound to smooth out joints, seams, low points, high points, and other features to create a visually flat wall.

For example, tool paths can include information corresponding to, or used to determine, instructions for one or more of movement systems 328, 348, 368 to drive the base unit 120, robotic arm 140 and/or end effector 160 to move to perform desired tasks, including applying joint compound, applying joint tape, and the like. Tool parameters can include various setting for components of the end effector 160 (e.g., setting for the mud applicator 466 and/or mudding devices 468 of a mudding end effector 160M), including a nozzle selection, a nozzle size setting, a mud flow rate, and the like as discussed in more detail herein.

The toolpaths and/or tool parameters can also be determined based on a desired or required finish for completed mud work or for a completed wall assembly. For example, areas of a wall or ceiling that are exposed to changing, harsh, or bright lights can receive a higher quality finish with tighter controls on tool planarity, tool overlaps, thickness and characteristics of compound applied, texture.

The application of mud to a surface can inform how the surface is to be sanded, smoothed or polished to achieve a desired finish. For example, toolpaths and/or tool parameters generated during mud work can serve as inputs for generating toolpaths and/or tool parameters for sanding, which in some examples can enable sanding to be tuned according to the application of the compound, features, and compound characteristics such as how the compound was dried, compound type, compound hardness, and layers of compound applied.

For example, the automated drywalling system 100 can determine toolpaths and/or tool parameters for performing mud work with a mudding end effector 160M, and these determined toolpaths, tool parameters, and/or data associated thereto can be used to determine toolpaths and/or tool parameters for one or more sanding tasks to be performed by the automated drywalling system 100 using a sanding end effector 160S.

Similarly, determining toolpaths and/or tool parameters for performing mud work with a mudding end effector 160M can be based on various suitable inputs, including toolpaths, tool parameters, and/or the like associated with hanging drywall or applying insulation to a wall assembly on which the drywall is hung. For example, the automated drywalling system 100 can determine toolpaths and/or tool parameters for performing drywall hanging with a hanging end effector 160H, and these determined toolpaths, tool parameters, and/or data associated thereto can be used to determine toolpaths and/or tool parameters for one or more mudding tasks to be performed by the automated drywalling system 100 using a mudding end effector 160M.

During mud work, automated drywalling system 100 can apply a layer or profile of compound that is greater than a thickness that can be conventionally manually applied by human workers to allow for a sanding system (e.g., a sanding end effector 160S) to sand down the compound to a desired plane. For example, in some examples, manual joint compound application mud can be profiled to taper from high points. The automated drywalling system 100 can apply a thicker layer than normal enabling a sanding system to sand down high points to be level to the adjacent surfaces.

For example, FIGS. 6a, 6b, 6c, 6d and 6e illustrate one example of a mud application profile for a pair of drywall pieces 610A, 610B that form a seam 620, where joint compound 630 is applied over consecutive layers, which can include joint tape 640, to taper out the high points of joint compound 630 over a wider area. Sanding can then be used to smooth out the final profile. The high points of joint compound 630 can be caused by various features, including the seam 620, feature, raised stud, defect, or any combination of these. In some embodiments, such a mud application can be undesirable for automated application; however, in further embodiments, such a mud application profile can be employed by an automated system such as the automated drywalling system 100.

FIGS. 7a and 7b illustrate an example joint compound application process where the joint compound 630 is applied in a thick layer using a sprayer that generates a mud spray 700. Such an application process can be performed by the automated drywalling system 100 in various embodiments. The thickness of the joint compound 630 being applied to the pieces of drywall 610A, 610B defining the seam 620 can allow for a sanding system to be used to sand back high points of joint compound 630 to a level surface. The high points of joint compound 630 can be caused by the seam 620, feature, raised stud, defect, or any combination of these.

The 2D or 3D maps created by the automated drywall system 100 can be registered to the physical environment utilizing recognizable features such as doors, windows, outlets, corners, or the like. Such registration can also be done using markers, tags, laser outlines that are placed in the room, or the like. A projection and/or visualization system of the automated drywall system 100 can find the features or markers and can locate the maps created using these found features or markers. The automated drywall system 100 can utilize a user interface to enable the user to help locate the map or projection relative to the environment and resolve any issues or discrepancies. A user can utilize a physical marker to signify key features for the automated drywall system 100 allowing the automated drywall system 100 to locate the plan relative to the environment. The automated drywall system 100 can also use a robotic manipulator or end effector 160 to find target features, markers or surfaces and locate them relative to its own base unit 120 which can be located using a localization system including, but not limited to laser range finders, computer vision, LIDAR, radar, sonar, stereo vision, odometry, IMUs, or any combination of these.

The robotic arm 140 can utilize a compliant end effector 160 to enable safe contact with the environment allowing the automated drywalling system 100 to accurately locate target surfaces, features or components, accommodate errors in positioning without damaging the substrate or the end effector 160. By utilizing the robotic arm 140 and compliant end effector 160 to locate a physical component, the system 100 can establish a point, line, or plane and therefore locate the virtual plan on the environment. Toolpaths can be updated from the virtual plane to the physical plane. Refitting of the toolpaths onto the contacted surfaces can enable the system 100 to deal with errors and discrepancies between the modeled and physical environment. Such tools, features or elements of the system 100 can enable quick on-site calibration using global room wide maps and local measurements. Refitting the toolpaths can allow for errors in positioning of end effector 160, mobile base 120 or robotic arm 140. The system 100, including an end effector 160 can utilize radar, sonar, thermal imaging to establish what is behind the substrate (e.g., drywall), this information can be used to update a virtual map and ensure that no damage is done to any electrical, plumbing or ventilation while working on or about the substrate.

The planner can output tool poses or tool paths for the automated drywalling system 100 (e.g., for an end effector 160, robotic arm 140, base unit 120) including, but not limited to joint commands, target poses and end effector positions, or any combination of these. The system 100 can also output paths for a gantry system or positioning stage which can be used in conjunction with the robotic arm 140 and/or end effector 160 or without a robot to move and position coating tools (e.g., mudding devices 466 and/or mudding applicators 468 of a mudding end effector 160M). The planner can also output paths for the mobile base 120 to position a gantry, positioning stage, robotic arm 140, end effector 160, or to move a tool to assist a user in the finishing process, or to position visualization and lighting equipment, which may or may not be a part of the automated drywalling system 100. The mobile base 120 and vertical lift 126 may work in coordination with a user, robotic arm 140, end effector 160 or a combination of these to execute the task. The planner system can control different components of the automated drywalling system 100 (e.g., the base unit 120, robotic arm 140 and/or end effector 160) allowing for coordinated movements and forces with the target goal of moving the end effector 160 or portions thereof to a desired position under the prescribed forces and moments. The mobile base unit 120 can be used as a rough positioning stage, with the vertical lift 126 setting the height of the robotic arm 140 and end effector 160 which may act as a fine positioning stage.

Figure 8A:
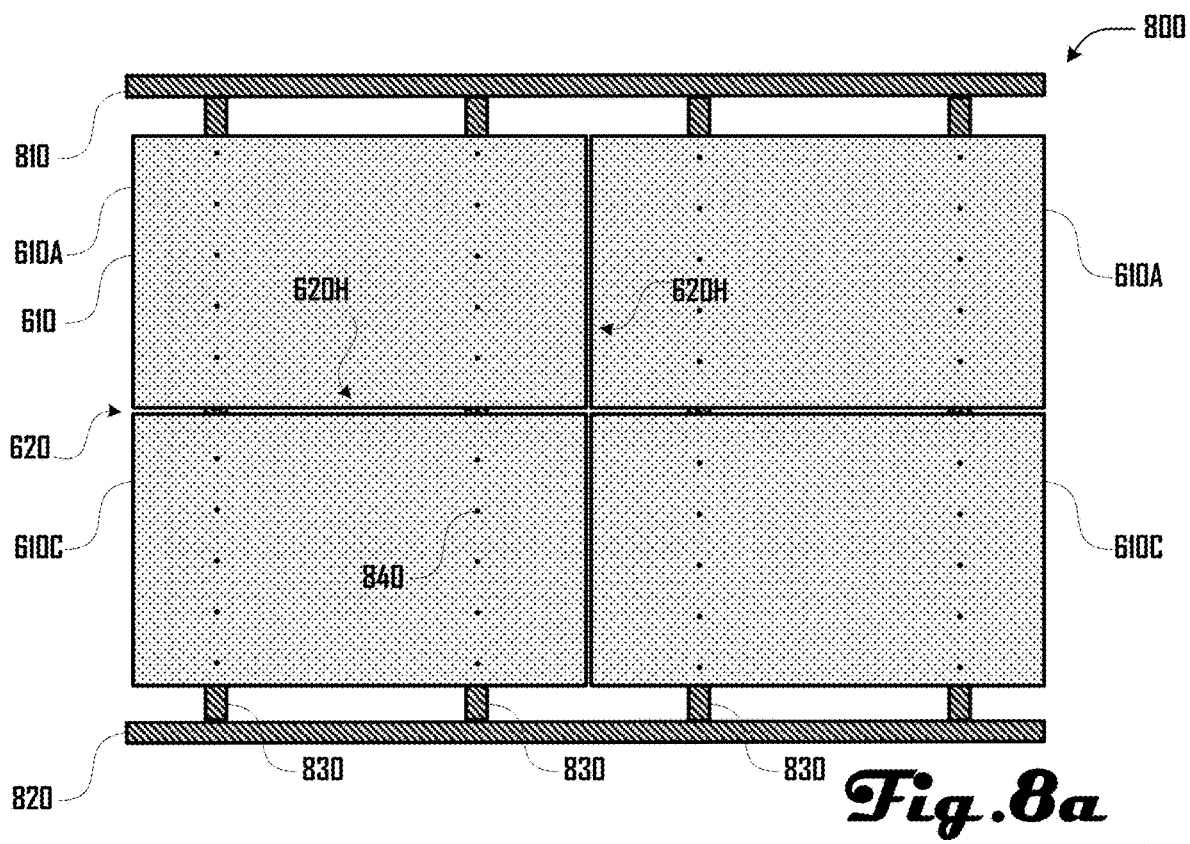
FIGS. 8a, 8b and 9 illustrate a series of steps in an example method of installing drywall to generate a wall assembly.
Figure 8B:
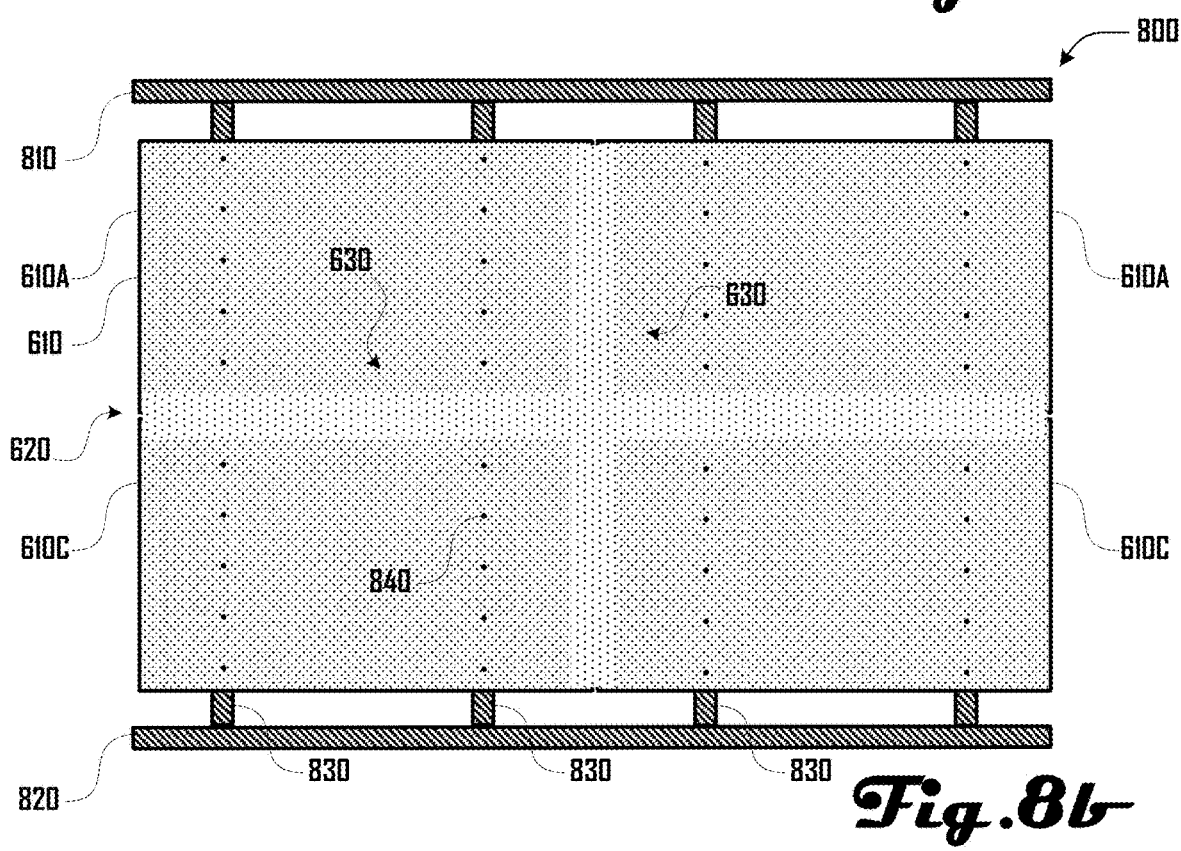
Figure 9:
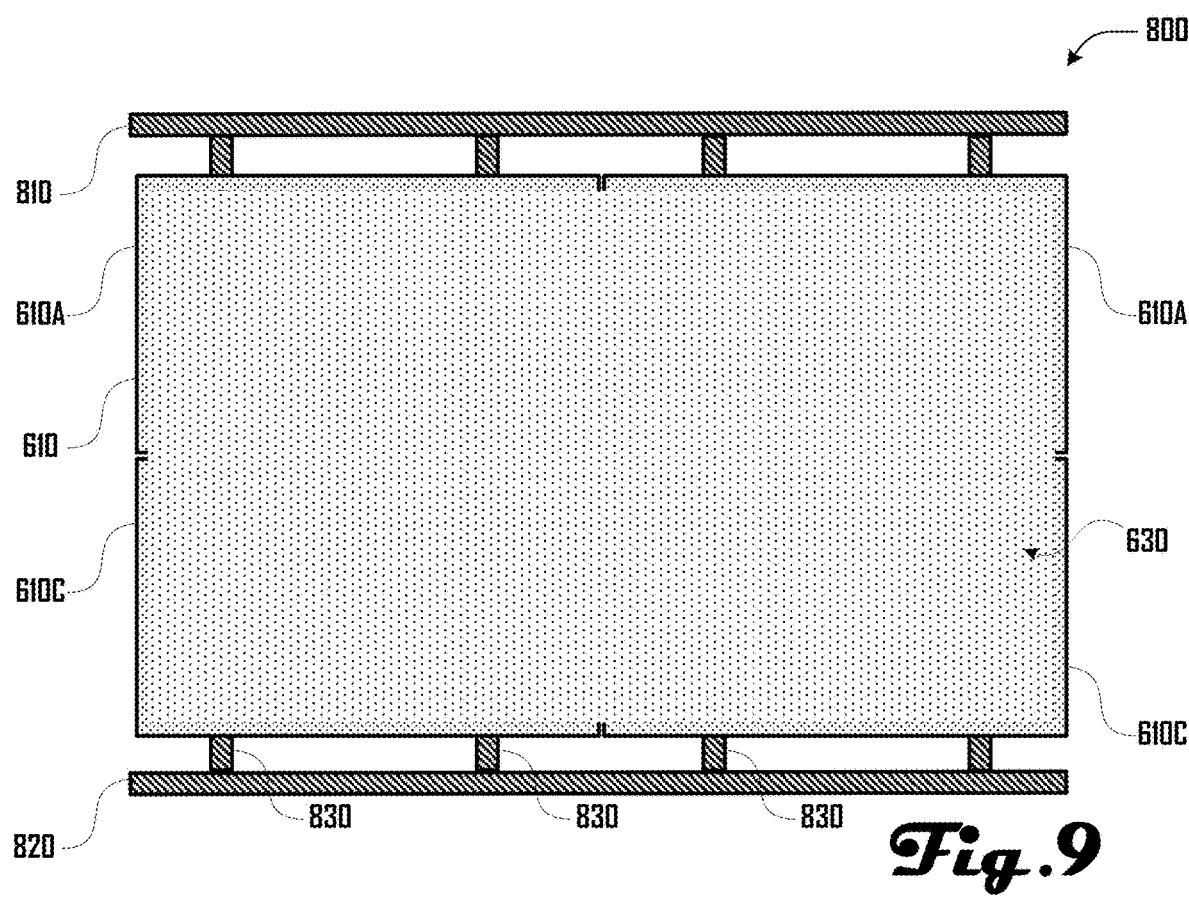

Turning to FIGS. 8a, 8b and 9, examples of a wall assembly 800 including a plurality of drywall pieces 610A, 610B, 610C, 610D is illustrated. The wall assembly 800 can comprise a header 810 and footer 820, with a plurality of studs 830 extending therebetween. As shown in FIG. 8a, the drywall pieces 610 can be coupled to the studs 830 via a plurality of fasteners (e.g., drywall screws) that extend though the drywall pieces 610 and into the studs 830. The drywall pieces 610 can define one or more seams 620, including in the example of FIG. 8a a vertical seam 620V and a horizontal seam 630H. In some embodiments, mud work can be performed on the seams 620 as shown in FIG. 8b and leaving portions of the drywall pieces 610 without joint compound 630. Additionally or alternatively, joint compound can be applied to portions of the drywall pieces 610 in addition to about the seams 620 as shown in FIG. 9.

Figure 10:
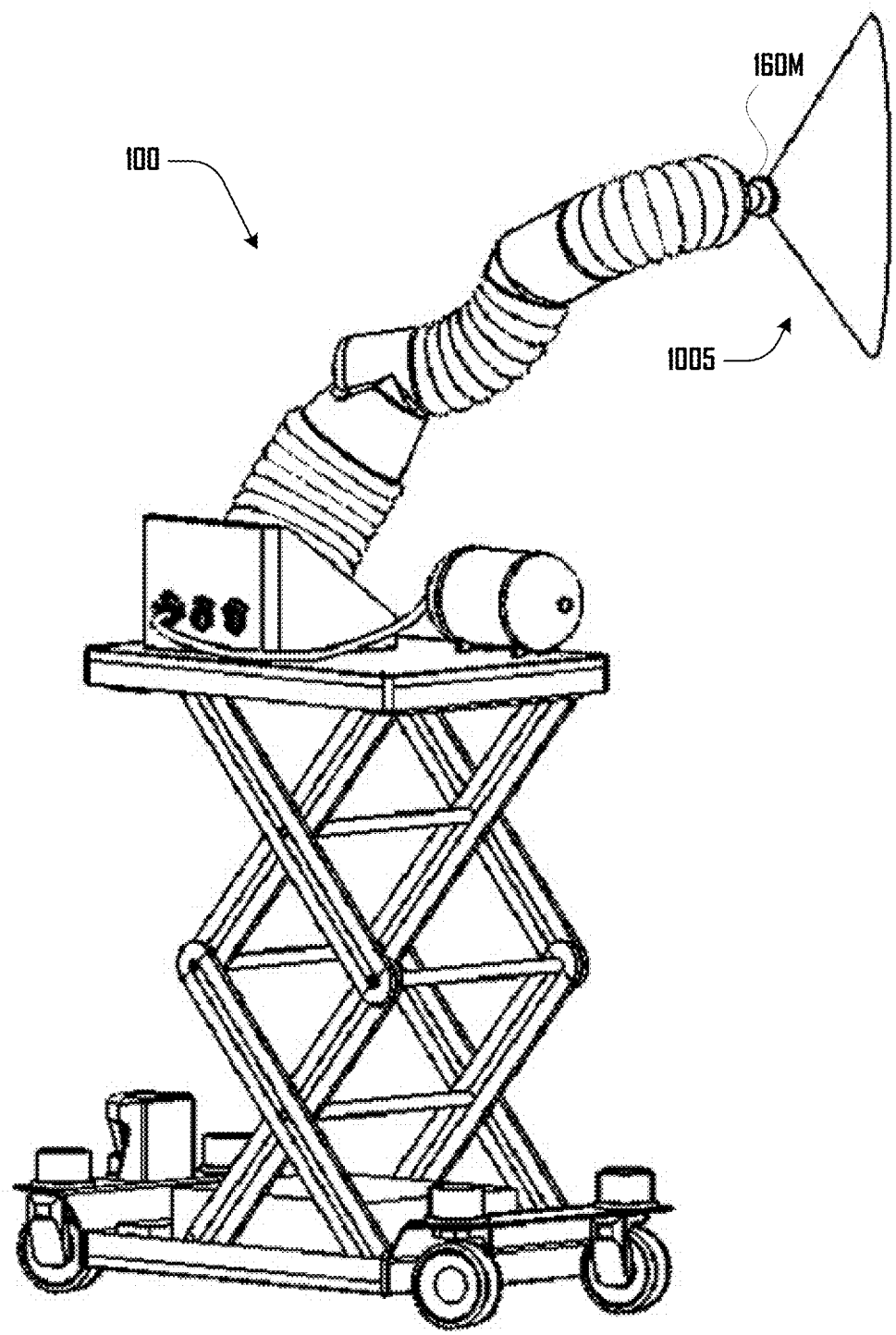
FIG. 10 illustrates an embodiment of a drywalling system applying joint compound to a wall assembly in accordance with one embodiment.

FIG. 10 illustrates one example embodiment of the automated drywall system 100, having a mudding end effector 160M that is configured to generate a mud spray. In this example embodiment, the system 100 is shown comprising a robotic arm 140 with a spraying end effector 160 with integrated overspray collection 1005. The robotic arm 140 and end effector 160 are shown mounted on a mobile base 120 with a vertical lift 126. The base unit 120 can carry supporting systems for the automated drywall system 100 as discussed herein.

Figure 11:
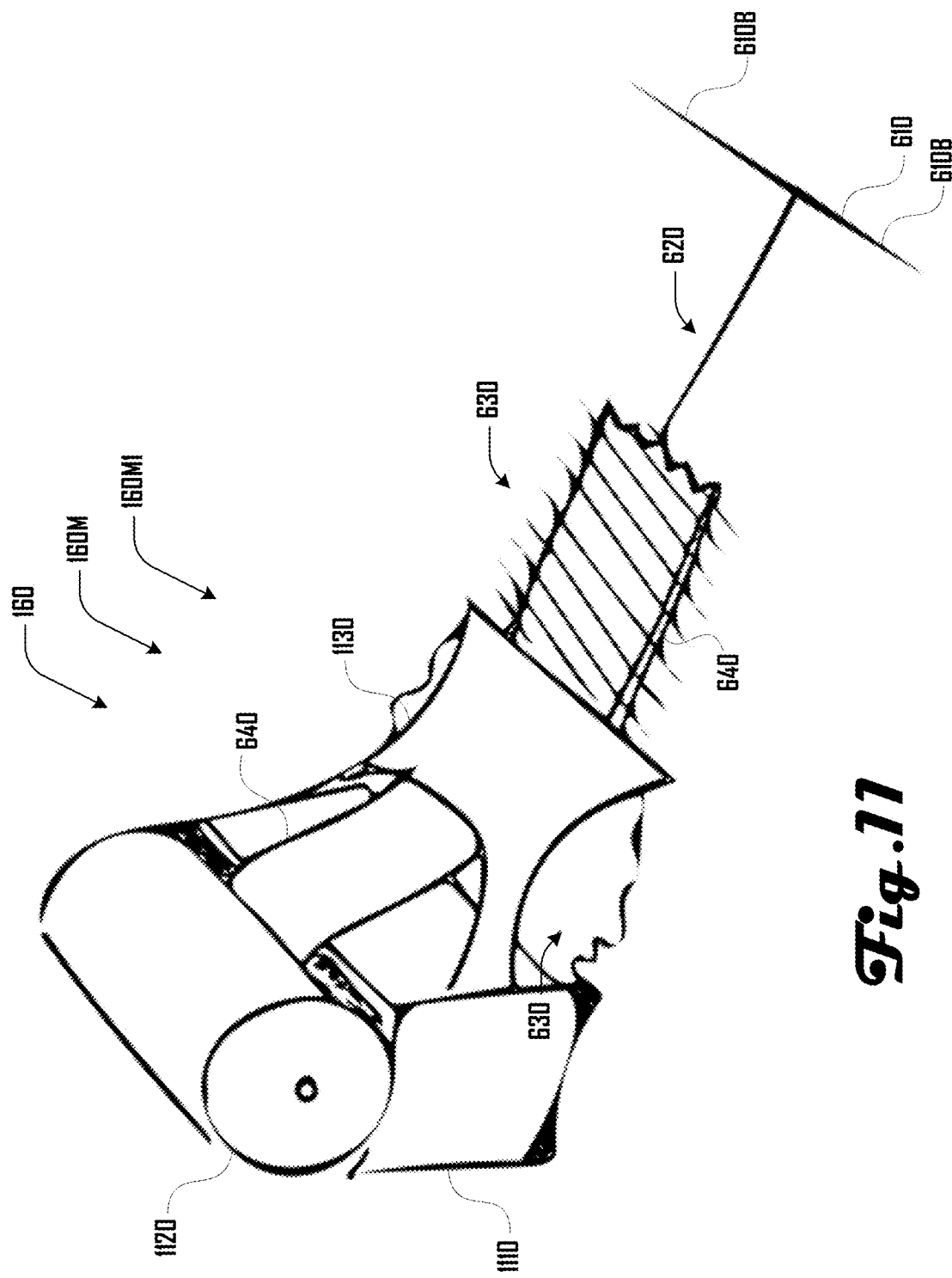
FIG. 11 illustrates an embodiment of a mudding end effector configured to automatically dispense and apply joint tape at seams between drywall boards.

An end effector 160, such as the embodiment 160M1 of a mudding end effector 160M, shown in FIG. 11 can utilize a tool to automatically dispense and apply joint tape 640 at the seams 620 between drywall boards 610. In this example embodiment 160M1, joint compound 630 can be dispensed from a flat box 1110 and joint tape 640 can dispensed from a roller 1120. The joint tape 640 can come into contact with the compound before a blade 1130, which can be used to apply the joint tape 640 and joint compound 640 onto the seam 620. The blade 1130 can smooth the tape 640 down and can apply the joint compound 640 on the seam 620.

In one embodiment, joint tape 640 can be fed off a roll 1120 onto a joint 620 defined by a first and second drywall piece 610A, 610B after being covered with joint compound 630. In some embodiments, joint compound 630 can be delivered ahead of the tape 640 and the 640 tape can be flattened onto the surface of the drywall pieces 610 and seam 620 using a blade or trowel 1130. The end effector 160 or other portion of the system 100 can also be used to automatically apply the tape 640 using tools such as banjo and bazooka systems. Tracking the position of the end effector 160 and portions thereof with devices, sensors, vision systems or other elements of the end effector 160, robotic arm 140 and/or base unit 120 can enable the planner to create an updated map of the room with the location of the tape 640 and/or joint compound 630 and the conditions under which one or both were applied.

One or more vision system 324, 364 can also use tags or markers to track as an end effector 160 or as a user applies tape 640 on the surfaces and/or seam 620 of one or more drywall pieces 610 and that information can be communicated to and stored by the planner. The end effector 160 and/or robotic arm 140 can be used to control the orientation of tools or devices of the end effector 160 and the force applied on a surface as tape 640 is applied, which can be desirable in some examples to ensure that the tape 640 is embedded within joint compound 630 as desired. The drywalling system 100 can apply, solid, porous and/or mesh joint tape 640 with or without adhesive that can be covered with joint compound 630 using a separate tool or a tool associated with an end effector 160.

Joint tape 640 can be applied by the automated drywalling system 100 and/or by an operator. Additionally, in some embodiments, joint tape 640 can be colored, dyed or marked so that it is easier for a vision system 324, 364 to identify the joint tape 640. Different color tapes 640, or tapes 640 having different identifying features (e.g., textures, images, barcodes, or the like) can be used in some embodiments to provide information to the automated drywalling system 100 about the identity or characteristics of a specific joint 620 or other feature of one or more piece of drywall 610. For example, butt joints can be covered with a first color tape 640, tapered joints can be covered with a second color tape 640, and factory joints can be covered with a third color tape 640. An end effector 160 can also use a joint compound 630 that comprises fibers in addition to, or as an alternative to, tape 640. One or more vision system 324, 364 can be used to identify seams 620 between drywall pieces 610 and data from such vision systems 324, 364 can be used to guide an end effector 160 during taping. The end effector 160 can also be guided using the planner's map of the surface which is located on the environment using relevant features such as markers, corners, openings, or the like.

Figure 12:
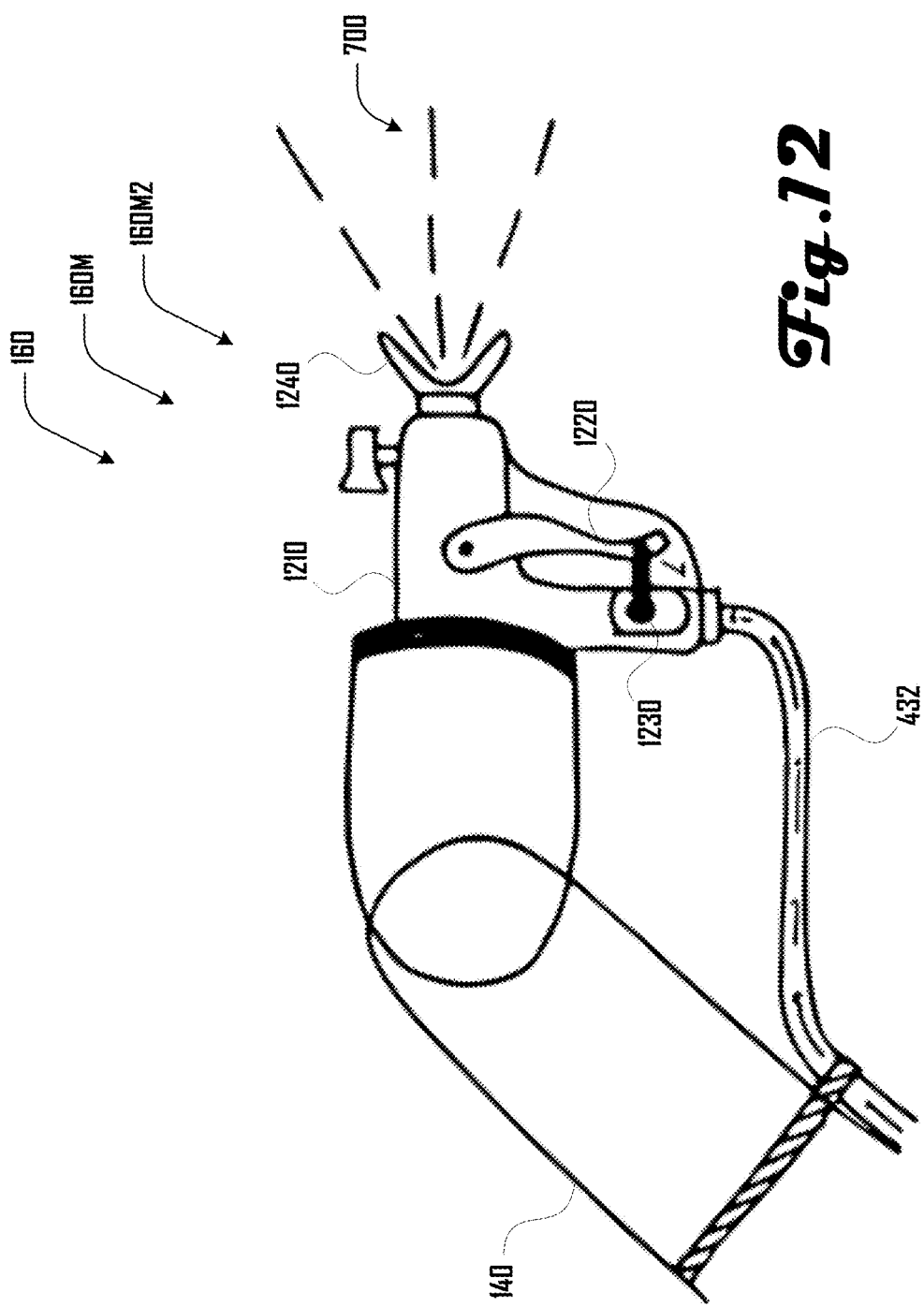
FIG. 12 illustrates one embodiment of a mudding end effector that includes a spray gun that is coupled onto the robotic arm.

The joint compound 630 or other coating can be delivered or applied onto joint tape 640, seams 620 and/or surfaces of drywall pieces 610 using a variety end effectors 160 having a variety of elements, devices, or tools. For example, FIG. 12 illustrates one embodiment 160M2 of a mudding end effector 160M that includes a spray gun 1210 that is coupled onto the robotic arm 140. A trigger 1220 can be actuated with an actuator 1230 (e.g., a servo, solenoid, pneumatic cylinder, or the like) which can pull on the trigger 1220 to open the nozzle 1240 to generate a mud spray 700.

Figure 13:
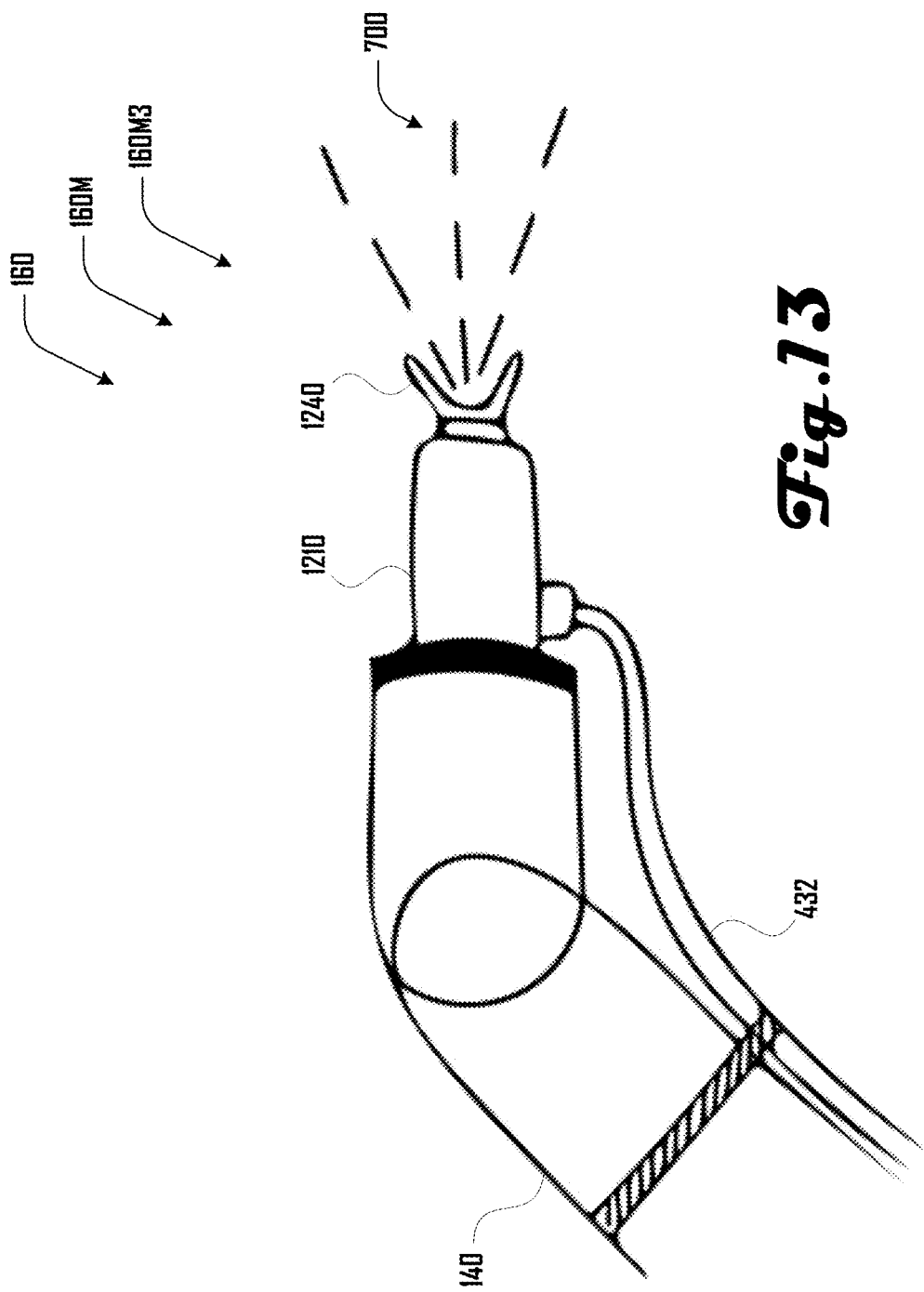
FIG. 13 illustrates another embodiment of a mudding end effector that includes a spray gun that is coupled onto the robotic arm.

In another example, FIG. 13 illustrates another embodiment 160M3 of a mudding end effector 160M that includes a spray gun 1210 that is coupled onto the robotic arm 140. An internal trigger (not shown) can be actuated with an actuator (e.g., a servo, solenoid, pneumatic cylinder, or the like) which can open the nozzle 1240 to generate a mud spray 700. In the examples of FIGS. 12 and 13, mud can be fed to the spray gun 1240 and nozzle 1240 via a mud tube 432, which can feed mud (e.g., joint compound, or the like) from a mud source 430 disposed at the base unit 120 (See FIG. 4).

In various embodiments a spray gun 1210 can comprise an airless spray system or air assisted spray system. A pump can be used to move the joint compound 630 from the mud source 430 to the spray gun 1210. The joint compound 630 can be pumped at high pressures, in some examples, to enable the joint compound 630 to be sprayed or aerosolized. In some examples, high joint compound particle speeds can produce a smoother finish, which can be desirable in some examples.

The pressure, flow rate, piping system resistance and the like, can be tuned or controlled by the automated drywalling system 100 to change the speed and amount of joint compound 630 being delivered to the spray gun 1210 and ejected from the nozzle 1240 as a spray 700. The automated drywalling system 100 can use any suitable actuator (e.g., a servo, solenoid, air cylinder, linear actuator, or any combination of these) to open and close the nozzle 1240 of the spray gun 1210. As shown in the example of FIG. 12, a manual spray gun 1210 can be instrumented to use an electro-mechanical system 1230 to pull the trigger 1220 allowing the system 100 to control the timing of the joint compound delivery as well as the opening and closing of the nozzle 1240.

As shown in the example of FIG. 13, an automatic spray gun 1210 can also be used and controlled by the system 100 directly. The robotic arm 140 and end effector 160 and/or base unit 120 can thereby be used to spray the joint compound 630 as a spray 700 onto surfaces of drywall pieces 610 and/or seams 620 defined by one or more drywall pieces 610. The joint compound 630 can be sprayed before and/or after applying joint tape 640. The automated drywalling system 100 can use a mesh or porous tape 640 in some examples to allow the joint compound 630 to be sprayed through the joint tape 640 to fill a gap under the joint tape 640 (e.g., a seam 620 or the like).

The spray gun 1210 can use a variety of suitable nozzles 1240 including fan shape, bell shape, or the like. The system 100 can also use a tunable spray gun 1210 that can control the shape of the nozzle 1210. The shape of the mud spray 700 may be controlled in some examples by physically changing the shape of the nozzle 1210. The shape of the mud spray 700 can also be controlled using air streams, or the like which can act on the mud spray 700.

In some embodiments, a cassette with different nozzles 1240 can be installed on the spray gun 1210 allowing the automated drywalling system 100 to select a desired nozzle 1240 to control the shape of the spray 700. A fan shape can also be tuned by using a set of sliding mechanisms to set the fan width and opening of the nozzle 1240. The diameter of a bell may also be tuned by a sliding cone with expanding orifice size. The robotic arm 140 and/or base unit 120 can also be used to move the nozzle 1240 closer or farther away from a target surface resulting in a narrower or wider fan or bell spray pattern respectively. The system 100 can utilize an array or series of nozzles 1240 to spray the coating over a larger surface. The nozzles 1240 can be individually controlled and tuned or such nozzles 1240 can be controlled as a unit.

A series of tests can be performed to establish the characteristics of a pattern of mud spray 700 delivered by a nozzle 1240. In one embodiment, one or more vision system 324, 364 can be used to characterize a pattern of mud spray 700 and provide feedback for tuning parameters including tool parameters related to a nozzle 1240, spray gun 1210, mud source 430, or the like, as discussed herein. Another embodiment can utilize an array of sensors (e.g., piezo sensors or other force sensors) on a test board which can be used to measure the force applied by the pattern of mud spray 700 as it hits the sensors. The force pattern can be used to estimate a profile of the pattern of mud spray 700 as it is hitting the surface. The feedback from these sensors may be used to tune the profile of one or more spray nozzles 1240, spray gun 1210, mud source 430, or the like.

The automated drywalling system 100 can include a mixer, pump and the like that can deliver mixed joint compound 630 to the various tools including a spray gun 1210. Such a mixer, pump and the like can be part of a mud source 430 disposed at the base unit 120 or disposed external to the system 100. A mixer may utilize sensors to control a mixing ratio of water, slurry or dry compound, and any additives that enhance structure of the compound, color the compound, decrease setting or drying time, or the like. The mixer can control the mix ratio by measuring the mass, volume, density, or viscosity of the components or the mixture that defines joint compound 630 or portions thereof. The mixing system can utilize pre-mixed joint compound 630 and can add water and/or additives as desired.

Figure 14:
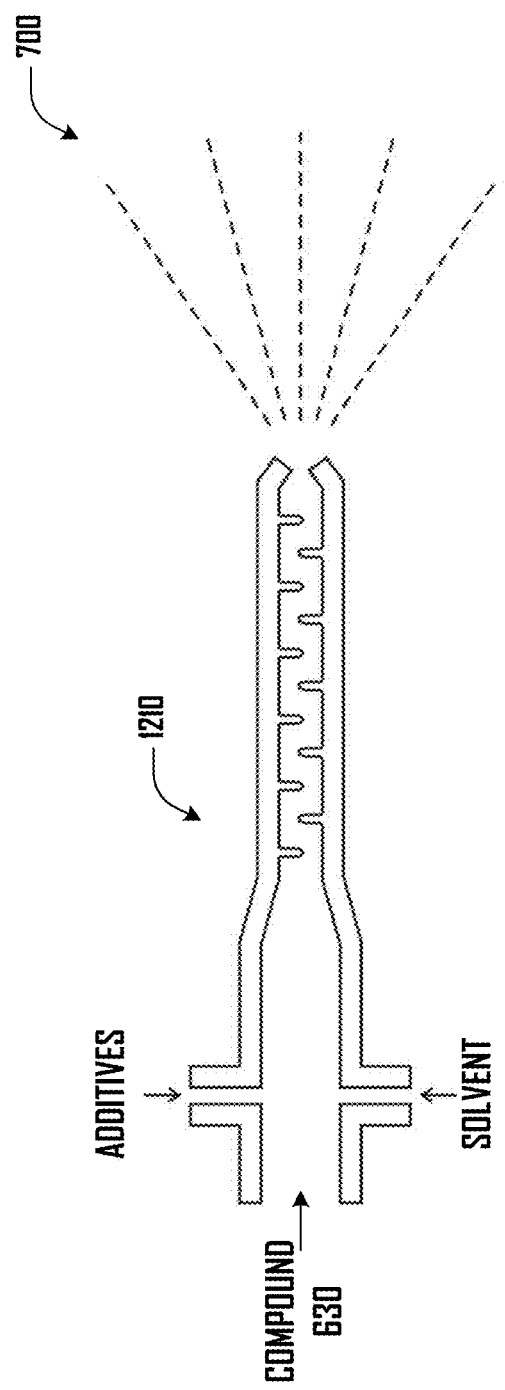
FIG. 14 illustrates an example of an in-line nozzle for mixing joint compound, water, and any additives at an application site.

The automated drywalling system 100 can also use a spray gun 1210 that has been designed to mix the components of the compound at the nozzle 1240. For example FIG. 14 illustrates an example of an in-line nozzle 1240 for mixing the joint compound 630, water, and any additives at the application site. The nozzle 1240 can be detachable in some examples to be cleaned or to be disposable.

In various embodiments, a nozzle 1240 can deliver a controllable ratio of water, air, slurry or dry joint compound, as well as additives that modify the joint compound, including enhancing the structure of the joint compound, color the joint compound, or decrease or increase setting or drying time. Nozzles 1240 as discussed herein can be used with any suitable type of mud, joint compound 430, or other material that can be sprayed, including but not limited to hot mud, plaster, or other curing compounds that set and cannot be washed off with water.

Compound lines 432, nozzle 1240, a pump, or the like, can be instrumented with sensors to measure flow rate, pressure and other desirable parameters. Pressure sensors can be used to monitor the pressure along a compound line 432 enabling the detection of changes in the pressure, flow rate, as well as the detection of clogs. In some examples, an orifice plate may be used to measure the flow rate through the system mud system in combination with a set of pressure sensors. Other flow rate sensors can include, but are not limited to a rotameter, spring and piston flow meter, ultrasonic flow meter, turbine meter, paddlewheel meter, variable area meter, positive displacement, vortex meter, pitot tube or differential pressure meters, or magnetic meters for conductive coatings. Detecting a change in flow, pressure in the mud line 432, or reaction force at the end effector 160 (e.g. at a spray gun 1210) can be used to determine that a clog has occurred. The spray gun 1210 can produce a reaction force when spraying so if that reaction force changes the system 100 can identify that the spray 700 has changed, which can be indicative of a clog or other issue.

Figure 15:
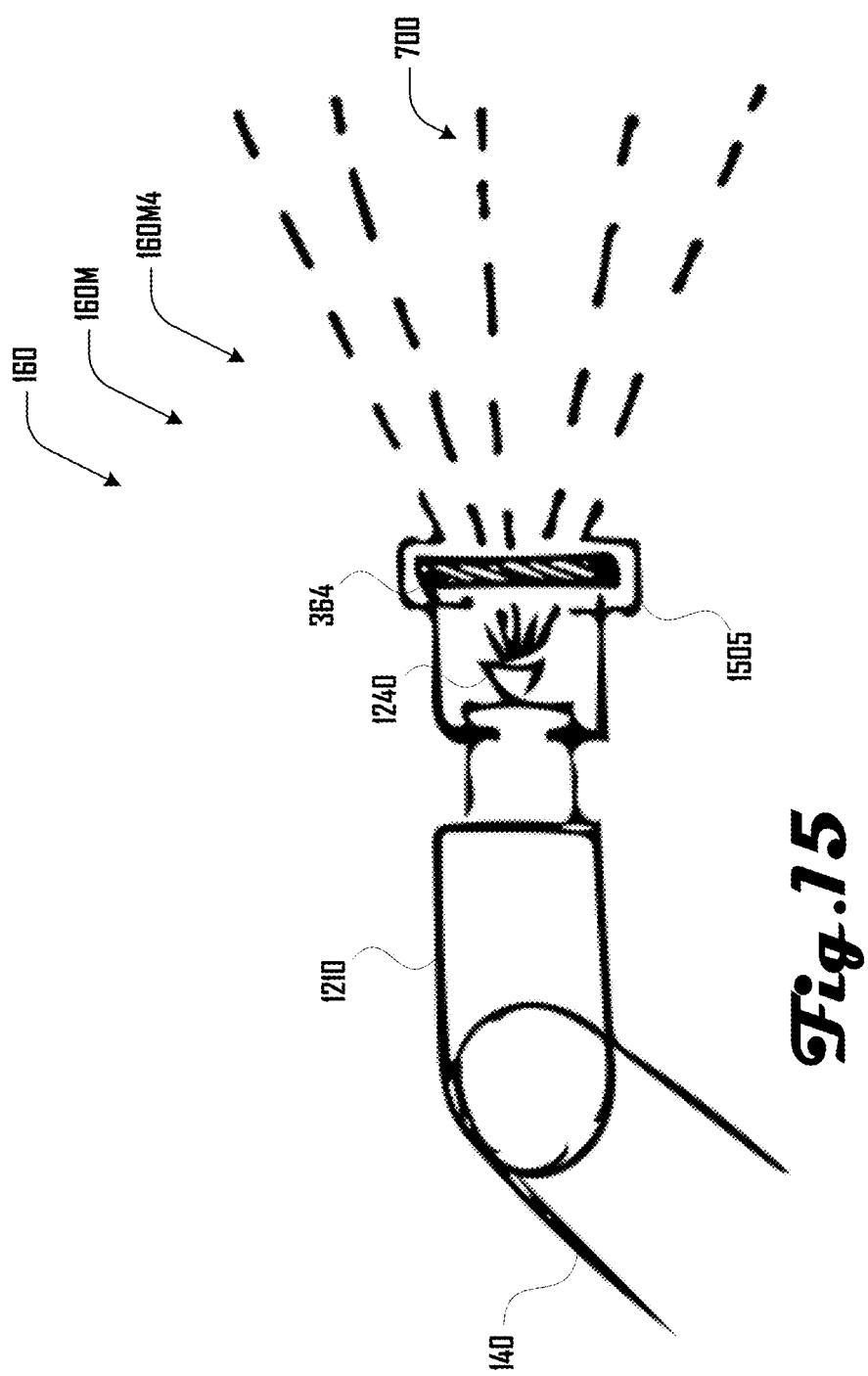

A pattern of the mud spray 700 can also be monitored to detect clogs or wear of the nozzle 1240. For example, FIG. 15 illustrates an example embodiment 160M4 of a mudding end effector 160M that includes a spray pattern detection mechanism 1505, in which a vision system 364 can be used to monitor the pattern of mud spray 700 coming out of the nozzle 1240 to detect clogs, nozzle wear, low pressure, or other problems with the spray gun 1210 or related system such as mud lines 432, mud source 430 or the like.

In some examples, the stream of mud spray 700 can be monitored or the pattern of mud spray on a target wall can be monitored. The stream of mud spray 700 and/or pattern of mud spray 700 can be monitored using vision sensors 364, which can include any suitable vision system, including but not limited to thermal sensors, moisture sensors, capacitance sensors, or the like.

In one embodiment, a camera can be placed next to the stream of mud spray 700 so that the profile of the mud spray 700 is captured. Image processing can be used to identify when the shape of the stream of mud spray 700 has changed. In another embodiment a laser curtain may be placed across the stream of mud spray 700, if the flow is interrupted along any part of the fan or bell the laser would complete its path and be detected by a sensor on the other side of the stream of mud spray 700.

A mixer, pump, mud lines 432, and nozzle 1240, and other suitable elements can be fitted with filters which can be used to catch debris or particles that may clog the nozzle 1240 or mud lines 432. The filters can be placed an inlet of the pump, outlet and inlet of the mixer, directly before the mud line 432, directly before the nozzle 1240, or any point along or within the mudding system. The automated drywalling system 100 can monitor the pressure before and after the filters to detect when the filters need to be changed. Flow rate sensors can also be used to detect a clogged filter. The automated drywall system 100 can reverse its flow to clear clogs from the mud line 432, nozzle 1240, filters, or other components.

Figure 16:
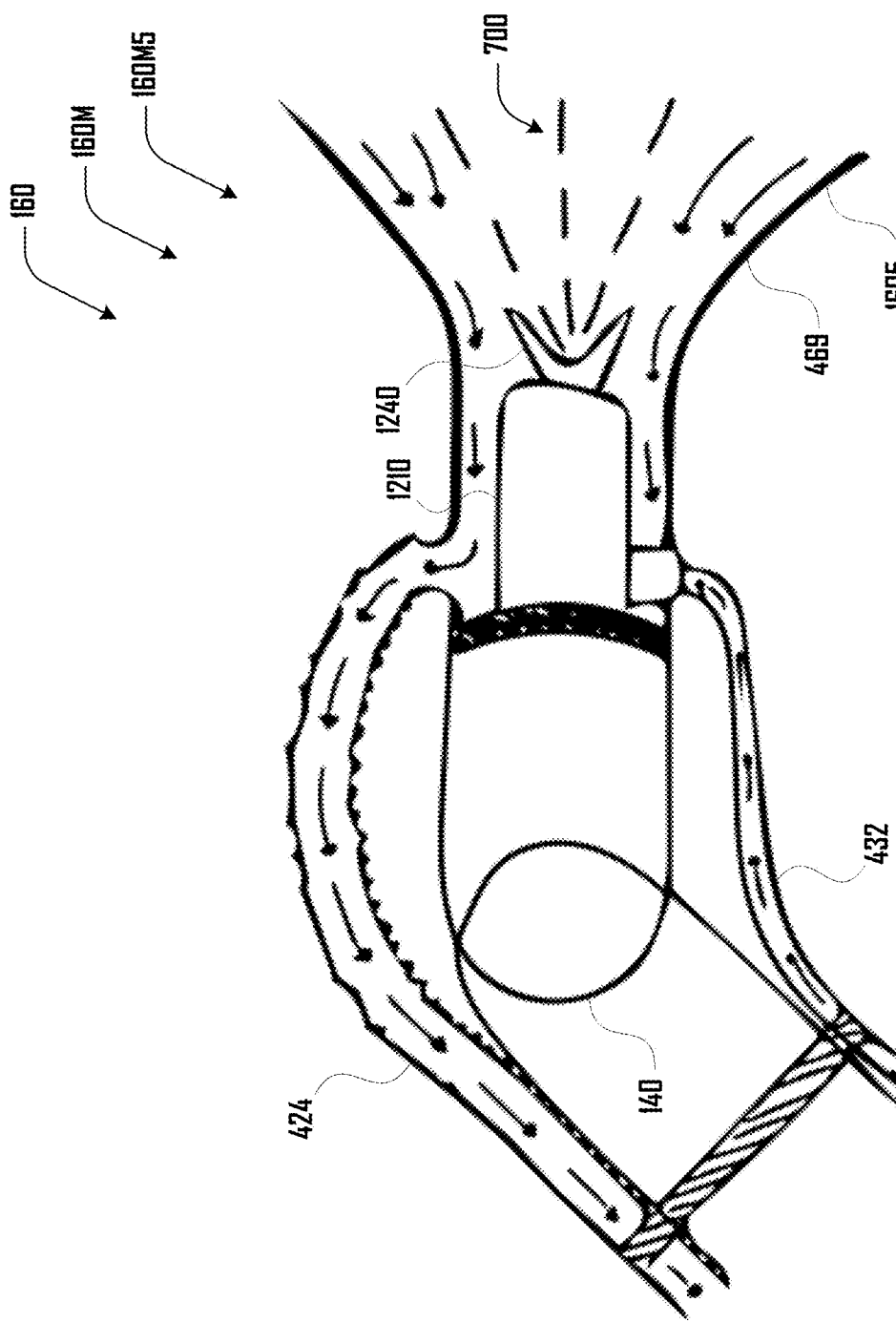
FIG. 16 illustrates an example embodiment of a mudding end effector that comprises a vacuum system that includes a vacuum hood disposed around an end and nozzle of a spray gun to capture overspray.

The spray gun 1210 or other mudding end effector 160M may also include a vacuum system 469, spray guards, or the like, that can be used to minimize overspray and reduce the amount of excess joint compound 430 in the air. For example, FIG. 16 illustrates an example embodiment 160M5 of a mudding end effector 160M that comprises a vacuum system 469 that includes a vacuum hood 1605 disposed around an end and nozzle 1640 of a spray gun 1610 to capture overspray. The vacuum hood 1605 can surround the spray gun 1210 and can include an adjustable vacuum setting. The vacuum hood 1605 can be coupled to the vacuum line 424, which is connected to the vacuum source 422 to provide a vacuum to the vacuum hood 1605.

Figure 17:
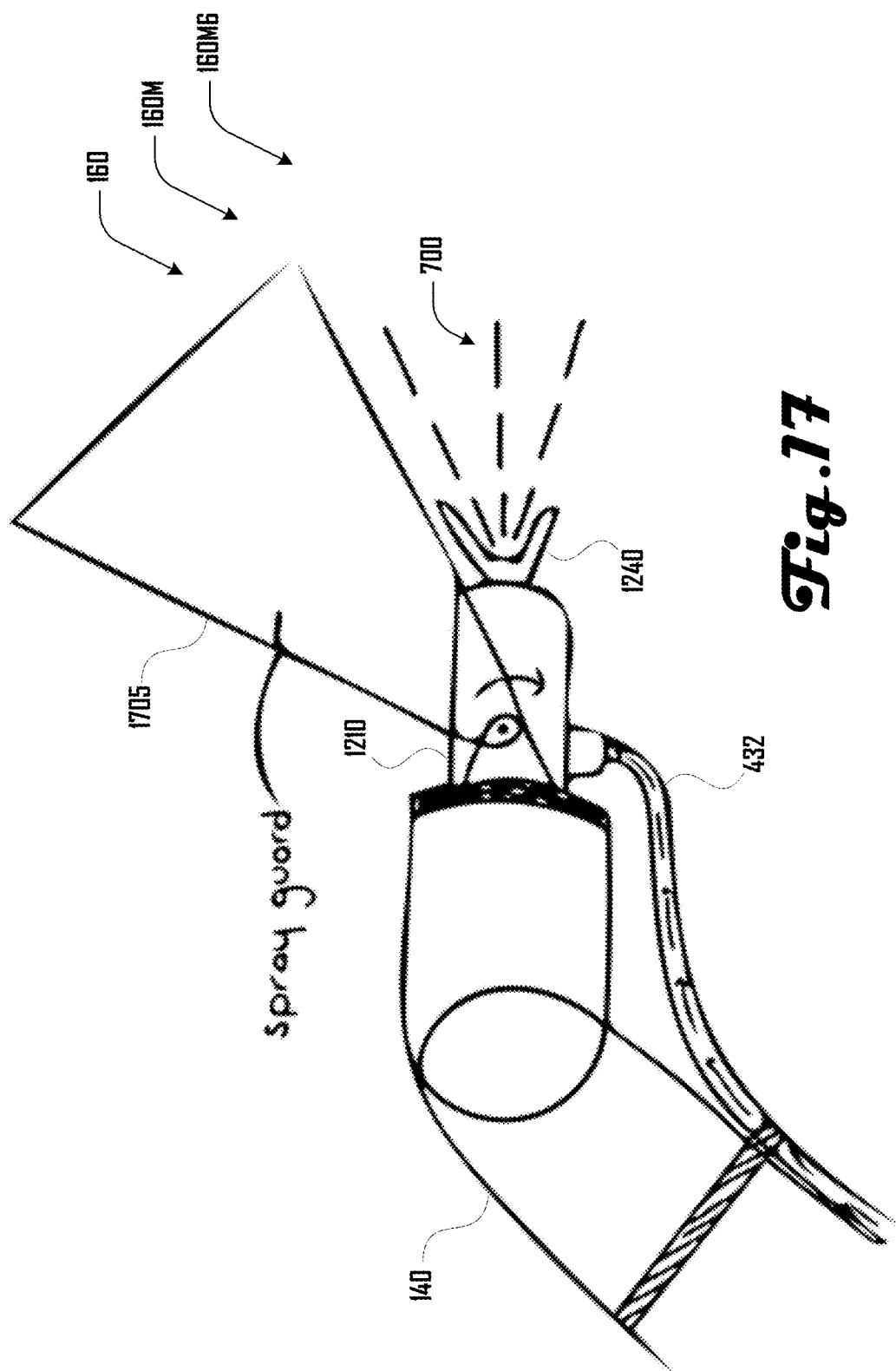
FIG. 17 illustrates an example embodiment of a mudding end effector that comprises a spray guard that partially extends about and past the face of the nozzle of the spray gun.

FIG. 17 illustrates an example embodiment 160M6 of a mudding end effector 160M that comprises a spray guard 1705 that partially extends about and past the face of the nozzle 1260 of the spray gun 1210. In this example, the spray guard 1705 is shown being generally triangular and fanning out from where the spray guard is coupled to the end effector 160M. In some examples, the spray guard 1750 can be selectively deployed by the system 100 or a user to prevent overspray onto an undesired surface. The spray guard 1705 can be deployed in various suitable ways, including but not limited to, via a servo, pneumatic cylinder, solenoid or other electromechanical actuator, which can rotate or otherwise deploy the spray guard 1705 into place.

In various embodiments, a mudding end effector 160M can comprise one or both of a vacuum system 469 and spray guard 1705 of various suitable configurations. The guard 1705 and/or vacuum system 469 can be deployed when the automated drywall system 100 is spraying near another surface or a feature. The spray guards 1705 and/or vacuum systems such as a vacuum hood 1605 can be retracted using a linear actuator, solenoid, air cylinder, or other suitable electro-mechanical actuator. In some embodiments, a spray guard 1705 can also be mounted on a rotary stage such that the spray guard 1705 can be rotated into place next to the sprayer 1210 by actuating the motor or servo. Accordingly, in some examples, the position of the spray guard about a circumference of the spray gun 1210 can be selected by the system 100 and/or a user.

In some embodiments, joint compound 630 can be applied and/or smoothed by using a blade that is dragged over applied joint compound 630. Such a blade can be part of an end effector 160 having a spray gun 1210 or can be a separate end effector 160. In some embodiments, a mudding end effector 160M can apply mud 630 and tape 640 at the same time for a layer, or can apply joint compound 630 over the tape 640 that has been previously applied. The shape, profile, and size of a mudding blade can be controlled to deliver a desired profile of compound 630. Similarly, the pressure or force on the mudding blade can also be controlled to change the thickness and profile of the applied compound 630, which can be based on data from the system 100 obtained from one or more vision system 324, 364, sensors 326, 346, 366, or the like.

Figure 18:
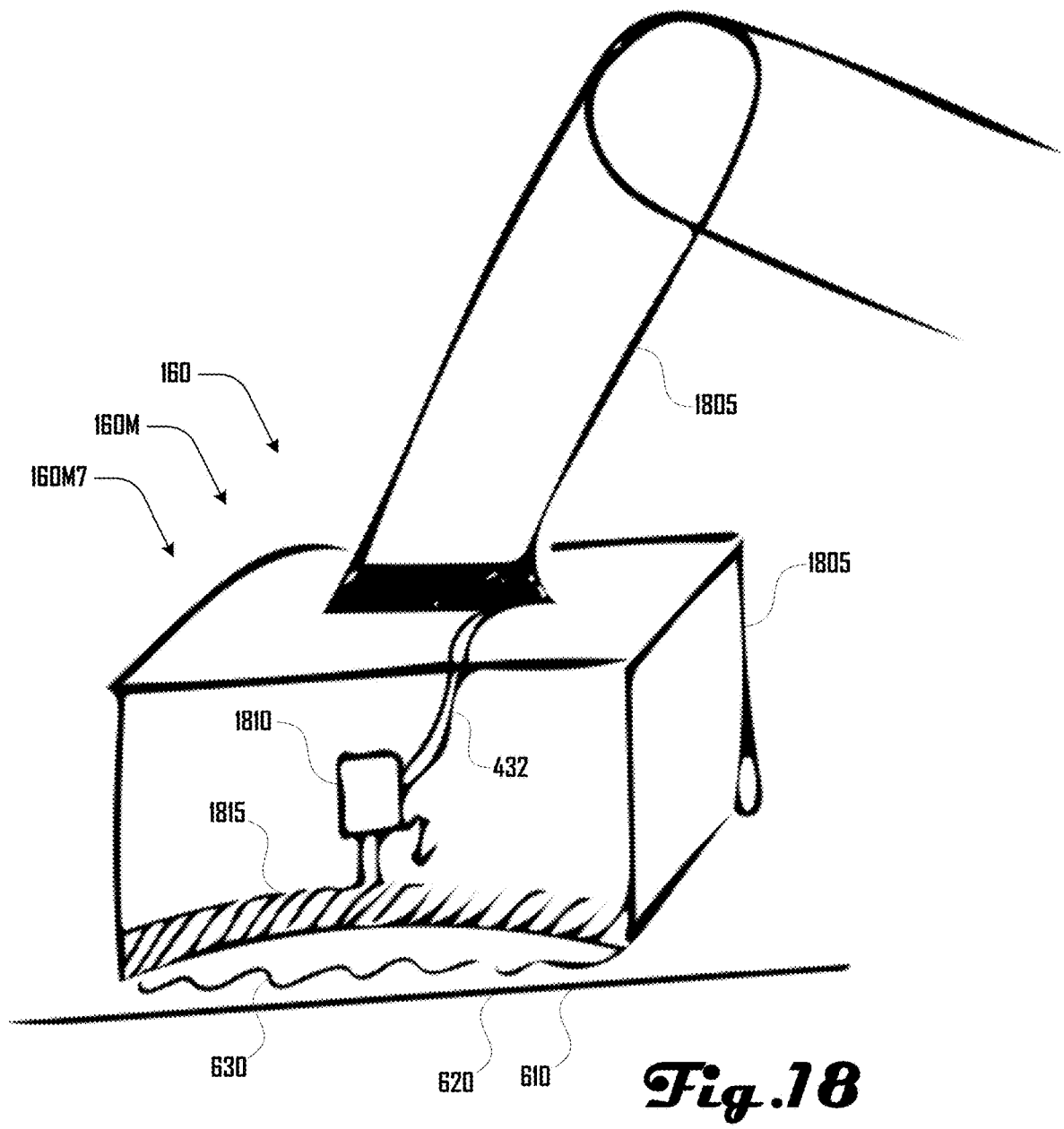
FIG. 18 illustrates an example of a mudding end effector that comprises a drywall flat box to apply the joint compound.

The automated drywall system 100 can also include a mudding end effector 160M that comprises a drywall flat box 1805 to apply the joint compound 630 as illustrated in the example embodiment 160M7 of FIG. 18. In various embodiments, the automated drywall system 100 can move the box 1805 along the seam 620. An actuator 1810 can control the shape and/or position of a blade 1815 to tune the profile of mud 630 applied on the seam 620. Various tool parameters, including box opening size, blade size, blade shape, and the like, can be controlled to simulate different sized boxes that are used to create a profile that feathers or blends a defect created by the seam 620 over a large portion of the boards 610 to simulate flatness.

The end effector box 1805 can be automatically fed using a mud pump and mud line 432. The mudding end effector 160M may also include sensors 366 (e.g., proximity, force, contact sensors) to ensure that the box 1805 is in contact with the drywall 610 during the application of joint compound 630. Additionally, a vision system 364, 324 of the end effector 160 or base unit 120 can also be used to ensure that the flat box 1805 is in contact with the surface of the drywall 610 during application of joint compound 630.

In some embodiments, a mudding end effector 160 can deliver joint compound 630 through a sprayer 1210 and/or nozzle 1240 and then utilize a physical blade, trowel, air blade, roller or any other type of forming mechanism to smooth and profile the compound 630. The mudding end effector 160M can utilize surrounding surfaces as datums. For example, a roller, wheel, blade, or the like, can be pushed in contact with the datum surface for reference. These contact points can extend away from a mud application zone to enable the use of datums away from the defect or joint 620. The mudding end effector 160M can control the position of the contact points such that the correct or optimal datum surface is used. The force and pressure on the contact points may also be controlled. Force may be directly measured or estimated by monitoring the deflection of the mounting structure.

The mud application or coating tools can be mounted in series with a structure that limits, sets, or controls the amount of force applied on a target surface. The structure can limit, set or control the normal force applied on the surface by the blades, rollers, trowels, and the like, and/or it can limit, set or control forces applied by the tools along the target surface as well as torques applied. Such blades or rollers can be mounted on an air bag, air shock, air cylinder, air bellows, with a fixed or variable pressure setting. The pressure and the normal area of the pressure vessel can set the amount of forces applied by the tool on the target surface. The blade or roller can also be mounted on a spring, tunable spring, shock, or the like, in order to set, limit or control the forces applied on the target surface. The forces may also be set, limited, or controlled using a pressure controlled hydraulic system including, but not limited to a cylinder, bellows, or reservoir. In one embodiment, a short-stroke low-mass end effector linear actuator mechanism can be used for fast tracking of surface contours and constant normal force. In embodiments with more than one blade or roller, the tools can be mounted on a single force limiting structure, or each head or multiple tools can be mounted on separate structures. Mounting the tools or group of tools on separate structures can allows for the applied forces and moments to be set, limited, or controlled separately.

Mudding or coating tools can include sensors 366 and/or a vision system 364 to ensure the desired orientation of the blades or rollers relative to the wall. For example, one application includes ensuring planarity of the tool to the wall; however, the mechanism may also set the blade or roller to a specific target angle relative to the surface. The planarity may be established by utilizing the vision system 364 to detect the plane of the surface and then match the tool position using the degrees of freedom of the system 100. The planarity may also be established by utilizing one or more sensor 366 at the end effector 160 (e.g., a set of proximity, range, or contact sensors to establish the position of a tool head relative to a wall). Blade or roller orientation can be controlled directly by setting the joint angles of the robotic arm 140, by a powered gimbal or joint at the end effector 160, and/or by a passive gimbal that allows the tool to tip and tilt relative to the end of the robotic arm 140. A passive gimbal can enable the contact tool to follow the plane of a target surface despite errors in the position of the system 100.

In another embodiment, the position of the contact may be controlled through the active gimbal using feedback from one or more of sensors 366, 346, 326 and/or vision systems 364, 324 that can establish the relative orientation between blades or rollers and surface. Powered or passive gimbals or end effector degrees of freedom can be encoded (e.g., via sensors 366) such that the orientation of the tool and/or end effector 160 is known to the system 100.

A mudding end effector 160M can also utilize outriggers such as rollers to use adjacent surfaces or raised edges as datums to guide the application of mud 630 and achieve accurate corners. These rollers may be instrumented with sensors 366 and/or a vision system 364 to measure or determine force, contact, proximity, or the like. Additionally, or alternatively, such rollers can passively make contact while the drywalling system 100 utilizes its sensors 366, 346, 326 (e.g., force and torque sensing) and/or vision systems 364, 324 to maintain a pressure or force against the datum surface. The information obtained or determined about tool orientation relative to the portions of the end effector 160, robotic arm 140 and/or base unit 120 can be used to alter the toolpath, tool parameters and/or other system configurations to ensure the coating automation system can carry out the process without running into limitations of the hardware.

In both passive and active embodiments, the angular position of a gimbal or other portion of an end effector 160 can be recorded (e.g., via sensors 366 or vision system 364) to locate and establish the plane of the target surface. The angular position of the gimbal can be recorded using elements including, but not limited to encoders on the rotary axis, laser range finders, capacitance sensors, IMUS, an external vision system, sonar sensors, potentiometers, motor loads, or any combination of these.

The gimbal system may be tuned to minimize dynamic effects by using springs, dampers or a combination of these. In some embodiments with more than one blade or roller, all tools may be mounted on a single gimbal structure or each tool or groups of tools may be mounted on separate gimbals. Mounting the blades or rollers on separate gimbals can allows for tool surface planes to be set, limited, or controlled separately. Mud application tools can be mounted on a gimbal in series with a compliant system described above that limits, sets, or controls the force applied on the surface.

Figure 19:
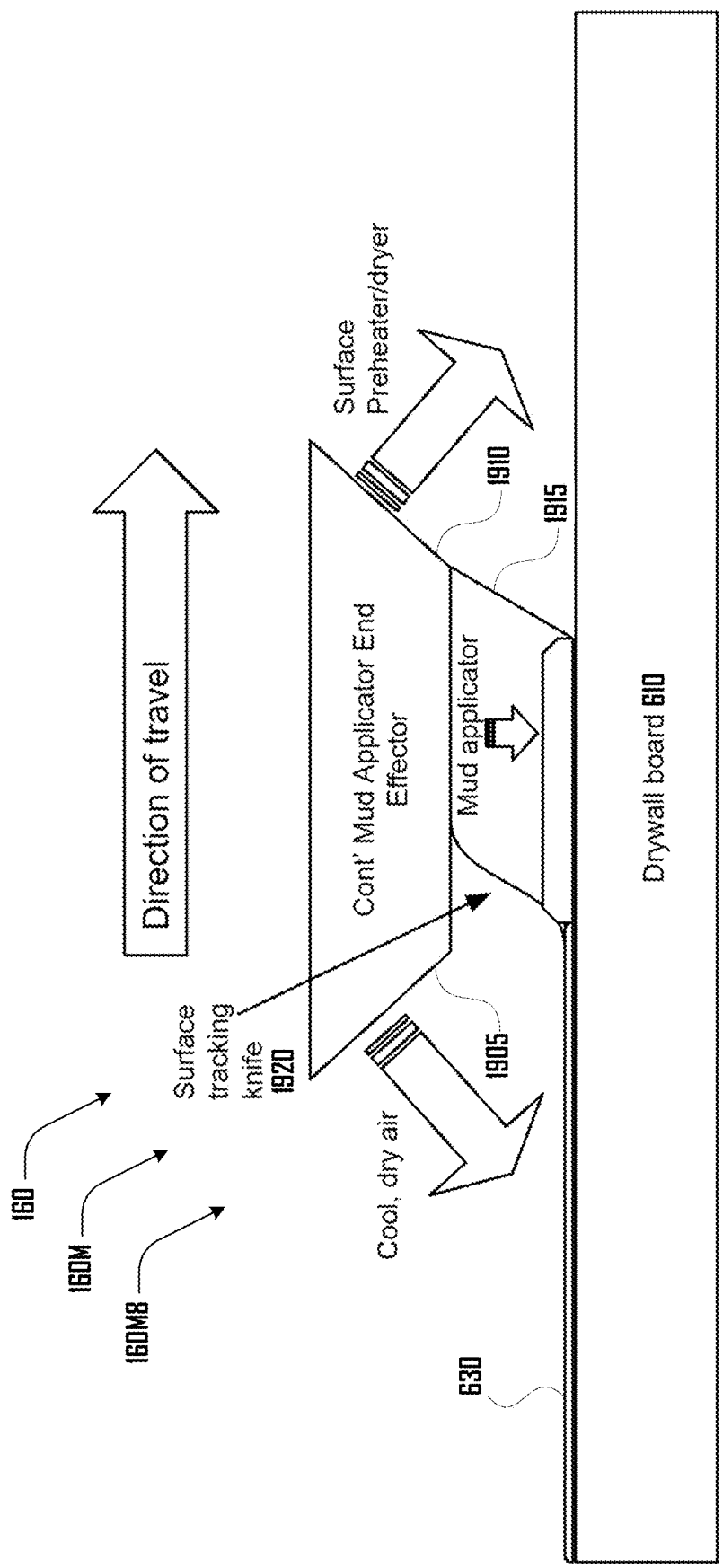
FIG. 19 illustrates an example embodiment of a mudding end effector that comprises a first blower and a second blower.

In some embodiments, a mudding end effector 160M can include elements including, but not limited to a heater, curing light, blower or a combination of these. For example, FIG. 19 illustrates an example embodiment 160M8 of a mudding end effector 160M that comprises a first blower 1905 and a second blower 1910. The first blower can be configured to apply cool and/or dry air to joint compound 630 that has been applied to the drywall board 610 by the mudding end effector 160M. The second blower 1910 can be configured to apply heat and/or dry air to a surface of drywall 610 on which joint compound 630 will be applied. As shown in FIG. 19, the mudding end effector 160M can include a mud applicator 1915 that can include a tracking knife 1920 that can be used to profile the mud 630. In various embodiments, preheating and drying the surface of drywall 610 on which mud 630 is being applied can improve the mud application process. Cooling and/or drying the applied mud 630 via the first blower 1905 can be desirable to speed the drying/curing process of the mud 630 and can improve the finish of the mud 630.

In various embodiments, elements including but not limited to a heater, fan, UV light, microwave emitter, or a combination of these elements can also be a separate part of the automated drywalling system 100. These components can be mounted on an end effector 160, a robotic arm 140, mobile base 120, positioning stage 122, gantry, or the like, or can be static in the room and separate from the automated drywalling system 100. A purpose of these components can be to speed up the curing, drying, or setting time of the compound 630, but can also be used to prepare the surface for the application of tape 640 or mud 630. An embodiment of the end effector 160 utilizes a heater that leads the mud application for preheating the surface of drywall 610 on which mud 630 will be applied by the mudding end effector 160M. The mud application point can be followed by a blower which can act over the applied mud 630. The mudding end effector 160M can also utilize two heaters leading and following the joint compound application or utilize two fans or a combination of these. The tool parameters or settings on the fan, heaters, or lights may be determined by the planning system (e.g., by the control system 322) using information from one or more of sensors 366, 346, 326 and/or vision systems 364, 324. For example, environmental sensors (e.g., temperature, humidity, and the like) and a prescribed joint compound composition and applied thickness can be used to determine tool parameters for environmental control tools or systems such heaters, coolers, blowers, or the like. In another example, the mudding end effector can comprise a thermal imaging camera to assess the temperature of the mud 630 and calculate the moisture content of the mud 630. The automated drywalling system 100 can also have a humidity sensor, conductivity sensor and depth or thickness sensors such as laser range finders, sonar, radar, LIDAR, and the like. Toolpaths, tool parameters settings, mud composition, fan, heater, light settings, and the like can be adjusted in real-time based at least in part on the measurements, sensing or data obtained from such sensors or visions systems.

The automated drywalling system 100 can utilize additives such as plaster of paris to accelerate the setting time of a coating of joint compound 630. An accelerant can be mixed into the joint compound 630 during preparation, added in at the nozzle 1240, applied to a coating of joint compound 630 after deposition, or any combination of these. The automated drywalling system 100 can utilize environmental information to decide the amount of accelerant to add and at what point in the process it should be introduced. In other words data from one or more vision system 324, 364 and/or sensors 326, 346, 366 to automatically modify the parameters of the composition, preparation, and application of joint compound 630. In some examples, accelerant may be sprayed on to a coating of joint compound 630 after the joint compound 630 has been applied onto the target surface.

The automated drywalling system 100 can utilize sensors (e.g., humidity or conductivity sensors) that are mounted on a surface of drywall 610 before mud application, which can provide for tracking of the moisture content of the surface of drywall 610 and/or joint compound 630 applied to the surface of drywall 610. Such sensors can be mounted directly onto the target surface, may be embedded in a joint 620, or can be mounted on a coupon that is covered at the beginning of the process with the same parameters. Such sensors can be connected to a wireless communication system to send signals/data to the automated drywalling system 100. Moisture content and other information collected by such sensors can be used to control or adjust the settings on fans, blowers, heaters, curing lights, an HVAC system, or the like. The drying speed can also be used to adjust the composition of the mud compound 630. Monitoring the moisture content can allow the system 100 to accurately estimate the time when the next drywalling process can begin (e.g., sanding, painting or the like).

The automated drywalling system 100 can also determine when the joint compound has set and dried by measuring the thermal conductivity of the covered seam 620, using a vision system (such as a thermal imaging camera); using a sensor such as a thermometer (contact or non-contact), or by detecting differences in colors using a vision system (e.g., due to color changes that occur between wet and dry joint compound 630. Various measurements can be used to infer the moisture content of joint compound 630 by comparing a determined temperature of the joint compound 630 to the surrounding materials such as a sheet of drywall 610. For example, as water or other solvent evaporates from a mixture of joint compound 630, the temperature of the joint compound 630 can be lower than that of the surrounding materials. Models of the joint compound drying process can also be used to estimate the time to dry or cure given a set of starting conditions and information about the environment. The environmental sensors and/or vision systems can be used in conjunction with an HVAC system or heater, air conditioner, fans, or the like, to control the room conditions at a worksite. The sensor readings can automatically trigger any of these systems or a combination to maintain the room at the desired conditions for quality, reduced drying time, or comfort of the operator.

In various embodiments, the automated drywall system 100 can use one or more vision system 324, 364 and/or sensors 326, 346, 366 to establish a condition of a wall of drywall before and after compound application to determine appropriate toolpaths and/or tool parameters. The system 100 can use computer vision, structured lights, stereo cameras, images, lights and shadows, LIDAR, radar, sonar, point clouds or any combination of these to establish the conditions of a target surface. These conditions can include establishing the surface plane relative to a mud application tool or another surface, detecting high or low points, curvature, and defects. One or more of the vision system 324, 364 can be used to create a topographical map of the surface to identify high and low spots. The map can be created after drywall 610 or other substrate has been hung. The map can also be an input from a board layout system that specifies the location and types of joints 620 and features in the room. The map can be updated by the one or more vision system 324, 364 as the system 100 is moved or moves around the room. The system 100 can also utilize rollers, proximity sensors, contact sensors, profilometers, and the like, to measure the profile of the surface. The robotic arm 140, end effector 160 and/or base unit 120 can be used to make contact with rollers or other mechanism on an encoded linear stage and then move these over the surface creating a topographical map. This can be done over joints or seams to determine the profile. The system 100 can then compute how the mud 630 should be applied and tapered to create a visually flat wall assembly.

To achieve the coating thickness on the drywall 610 or other substrate, the system 100 can optimize the delivery of the compound 630 to build up more compound 630 on low spots and less on high spots. The system 100 can also use information of the joint location to profile the mud delivery to account for the height variations typical of joints 620. The end effector 160 can then be used to apply a specific profile of joint compound 630 to the wall. This can be done by controlling the profile of the sprayer 1210, the shape and size of a troweling blade, the distance between the end effector 160 and board of drywall 610, the flow rate of joint compound 630, the tool speed, the number of passes over a given spot, or the consistency of the joint compound 630. The robotic arm 140 and/or end effector 160 can utilize force control to apply the pressure required to deliver a desired amount of joint compound 630 or to achieve a desired surface texture or roughness.

A thickness measurement can also be used to determine the amount of compound 630 that is to be delivered to a given spot. The system 100 can also tune the profile of the delivered mud 630 to account for overlap of the subsequent application. The mud thickness at the edges can be reduced or feathered such that the overlap region achieves the final desired thickness. This approach can also be used to increase overlap error tolerance at transition points between robot workspaces. The automated system 100 can utilize the information about the room, compound mixture and desired compound profile to determine the application profile desired to account for shrinkage of the joint compound 630. The system 100 can also use shrinkage models with environmental information obtained from sensors or vision systems to anticipate the shrinkage of the joint compound 630 as it dries. The delivered profile can account for shrinkage by increasing thickness of compound 630 applied such that the final post-shrinkage profile is the desired profile to achieve a visually flat wall. Compound mixture definition can include real-time automatic adjustments of gypsum, plaster of paris, and water content for optimal results given environmental conditions (determined based on data from sensors and/or visions systems), and layer finish requirements.

The system 100 can be instrumented with vision systems 324, 364 and/or sensors 326, 346, 366 that can be used to improve operation and ensure quality. During compound application the system 100 can use sensors 366 (e.g., force and torque sensors) mounted directly on the end effector 160, or sensors 346 on the robotic arm 140, and/or force and torque estimates determined by sensors 346 of robotic joints of the robotic arm 140 to apply a desired force during troweling or taping. The vision systems 324, 364 and/or sensors 326, 346, 366 can monitor force normal to a blade or rollers or on multiple axes including torque measurements and six-axis sensing. The force sensing can be used to control the force or pressure applied by one or more tool of an end effector 160. A minimum force or contact readings can also be used to ensure contact is made before the joint compound 630 is allowed to flow, and force below a certain threshold or loss of contact can trigger the stop of joint compound flow. The automated drywalling system 100 can use the force information to operate in force control, where the motions and speeds of the system 100 are driven to ensure a given force is applied in the desired directions. Similarly, force sensing can be used to detect contact with an object, obstacle, or intersecting wall or ceiling. By monitoring forces and torque on various portions of the robotic arm 140, base unit 120 and/or end effectors 160, the system 100 can detect that it has made contact with the adjacent wall or ceiling and alter the toolpath accordingly. The measurements can also be used to detect accidental contact and trigger a safety operation such as stopping the system 100 or retracting away from contact point. The system 100, including the end effector 160 can also use sensors (e.g., contact or proximity sensors) and/or visions sensors to detect that the end effector 160 is touching the surface, obstacle, object, or worker, as well as detect the distance to an adjacent surface or contact with that surface. The force, contact, displacement, or proximity sensors can be mounted on outriggers from the end effector 160 to sense obstacles, objects, or adjacent surfaces ahead of the end effector 160. The system 100 can detect, follow, and use adjacent walls as datums to guide coating application and achieve accurate corners. For example, in some embodiments, the end effector 160 can comprise a guiding element configured to engage a target surface, adjacent walls, or the like, to allow the end effector 160 to be guided in mudding the target surface. For example, such a guiding element can include an arm extending from the end effector 160, with the arm having a roller at the end of the arm configured to engage the target surface or portion of a wall assembly as a mudding guide.

The base unit 120, robotic arm 140 and/or end effector 160 can utilize multiple control strategies to complete various tasks. Position control can be used to command the system 100 to follow a trajectory given speed, acceleration, and jerk constraints. The system 100 can be controlled at the joint level by giving commands to the joints to achieve the desired robot state and tool position, or the control can be done at a higher level allowing a user or program to control end effector position and orientation. The system 100 can be controlled in task space where the system 100 controls a tool relative to the task. This approach can focus on achieving a desired tool position, orientation, speed, or the like, relative to the target surface rather than on each joint reaching its target goal. The system 100 can utilize force control to control the force applied to the target surface, an obstacle, adjacent surfaces, objects and so on. The applied force can be controlled in a single or multiple axes. Hybrid control modes can also be used. For example the system 100 can be commanded to achieve a given position as long as a given force is not exceeded.

The one or both of the vision system 324, 364 can be used to capture where and how the joint compound 630 has been applied. By monitoring the spray pattern applied on the wall the system 100 can detect clogs, nozzle or blade wear, or other problems. In one example, a thermal camera can be used to detect the applied compound 630, which can be at a different temperature than the target material. The compound's temperature can be controlled to facilitate detection. Monitoring the compound temperature can also give information on the moisture content of the joint compound 630. The joint compound 630 can have a prescribed coloring or additives to create contrast between the target surface and the compound 630 facilitating the detection of areas that have been covered by the compound 630. The color can change as the compound 630 dries as well as after it has been sanded. The system 100 can also apply compounds 630 in layers with different colors in different layers of compound 630 to facilitate detecting how much compound 630 has been removed during application or sanding of joint compound 630. Sensing such as capacitance, radar, resistance, humidity, conductivity, sonar measurements, or any combination of these can also be used to establish the thickness of the compound 630. Lights can be mounted on the system 100 or externally to illuminate the surface enabling the detection of coated surfaces, high and low points, tool marks, coating roughness, orange peel, and defects using one or both of vision systems 324, 364.

The system 100 can monitor the coverage achieved by the end effector 160 and update tool paths and tool parameters to ensure the desired coating profile is being applied. For example, the system 100 can dynamically tune a sprayer fan and/or bell until the spray pattern matches the desired shape, thickness, size. The system 100 can also move the sprayer 1210 closer or farther away from the target surface to change the spray pattern. The system 100 can also tune the material flow rate, pressure, spray tool speed, or the like, to achieve a desired thickness. The toolpaths and/or tool parameters can also be updated to ensure that the correct overlap is being achieved.

The system 100 can also utilize a feedback mechanism for communicating contact, forces, gimbal displacement information, tool orientation, motor loads, humidity and temperature readings, measurements of the applied compound 630, to system 100 (e.g., to the control system 322) for the purpose of real time updating of the tool paths and tool parameters for improving finish of joint compound 630. The system 100 can use tool position and orientation, captured surface conditions and models to update the robotic toolpaths to ensure that a desired position and/or contact is maintained during application of joint compound 630.

The system 100 can also determine areas that need another application of mud 630, rework using automated drywalling system 100, or rework to be done manually by the user. The user can also use a user interface of the system 100 to indicate areas that the user has identified as needing rework or need to be coated again. The system 100 can use this input along with other information about the previous work to create a new toolpath. Both user and system feedback can be fed into a machine learning algorithm to create a better model for coating future surfaces given a set of initial conditions.

The automated drywalling system 100 can utilize a user interface to enable the worker to control, program, debug, plan, and setup the system 100. The user interface can be used to give the user information of all the steps that must be taken to setup the system 100. Each step can be checked off when complete and the user can request more information on each step. The workspace of the system 100 can be shown overlaid on a camera feed or projected onto the target surface to help the user position the end effector 160, robotic arm 140 and/or mobile base unit 120. The workspace can be projected using lights or lasers. The system 100 can also automatically perform certain steps and the user interface can report the progress of each step, as well as give guidance to the steps the user can follow to perform a task. The user interface can be used to setup the system 100 and run any calibration routines required. The interface can also be used to plan a job including detecting wall, user definition of path parameters or path itself, auto generation of the tool path, user input of tool parameters, and automatically optimized tool parameters given a set of user inputs.

The user interface can be a graphical user interface and include a 2D or 3D representation of the worksite and workspace. The representation can include camera feeds as well as computer models and reconstructions created using sensor data. The interface can overlay paths, quality visuals, progress, robot model, or the like, over camera or workspace models. As the task is completed the path can be highlighted in different colors or with different style lines to indicate completion, quality achieved, problem areas among others.

Any problems, issues, or bugs can be reported in the user interface. Lights on the end effector 160, mobile base 120 and/or robotic arm 140 as well as sounds can also be used to indicate problems, movement of the end effector 160, base unit 120 and/or robotic arm 140; that work is in progress; that the system 100 is on or off; that toolpath is running or paused, that the system 100 needs attention or refill of materials; and any other indicators of the system state. The user interface can also display information on the progress, task and tool parameters, and quality metrics of the task being performed. Environmental conditions can also be displayed and recorded by the interface. The system 100 can indicate to the user what steps to take to correct or improve conditions including air quality, temperature and humidity. If the system 100 detects unsuitable or unsafe conditions it can display a message warning the user and providing guidance on next steps. The system 100 can use an optimization to find what parameters could be used to improve the process including reducing work time, increasing quality, and minimizing material usage among others. The user interface can also create reports on the tasks executed, quality metrics, environmental conditions, completion, and performance logs. Information can include robot workspace, tool paths, progress, sequence of approach, application rates and thicknesses, spray pressures and flow rates, forces applied by the tool, coverage record, path speed, tracking error, time to complete the task, tool time, setup time, vacuum waste material collected, cleaning time. The user interface can also display on filter conditions, and the system 100 can trigger an alarm or instruction when the filter needs to be replaced or cleaned.

The user can interface with the system 100 using a computer, tablet, touch screen, mobile device, pendant, joystick, controller, or buttons directly on the system 100. The worker can also position and train the robotic arm 140 and/or end effector 160 by directly moving joints of the robotic arm 140 or end effector 160. The user interface, controller, or buttons can be used to record positions as well as change the control mode and task.

An augmented reality system can be used to show the worker a toolpath plan generated by the system 100, instructions, original BIM or plan, or a combination of these. The augmented reality can be displayed using a headset, smart goggles, projections, or the like. The worker can be shown areas that require manual coating application. The user can also overlay the location of studs, framing, pipes, ducts, electrical system behind the board to facilitate compound application. Mudding tools, both manual and automated can be tracked in the map using tags, IMUs, or other sensors and a warning can be given to the operator if an attempt is made to apply compound 630 in an erroneous position or under the wrong tool settings. The system 100 or tools can also utilize radar, sonar, thermal imaging to establish what is behind the substrate.

The automated drywalling system 100 can also produce a visualization, paths, or instructions or a combination of these to guide the user in completing manual work. The visualization can include 2D or 3D maps marking the areas of work with labels. The visualization system can also include a projection of the plan onto the target surface this can be done with a laser system, projector or through augmented reality headset or goggles worn by the user.

The coating time, pressure, material flow rate, mud characteristics, and clogs can be tracked to inform when a nozzle 1210 or blade 1130 should be cleaned or changed. For example, FIG. 20 illustrates an example embodiment 160M9 of a mudding end effector 160M, which comprises a nozzle cassette system 2005 where a cassette of nozzles 1240 is attached to the end of the spray gun 1210. The cassette system 2005 can be rotated (e.g., via an electromechanical system) to deliver a nozzle 1240 to the spray gun 1210 for use.

FIG. 21 illustrates another example embodiment 160M10 of a mudding end effector 160M that comprises of a nozzle rotating system 2105 that can be part of a spray gun 1210. In this example, the system 100 can utilize an actuator assembly 2110 (e.g., a servo or other electromechanical actuator) to rotate (e.g., 180 degrees) a portion 2115 of the nozzle 1210 allowing for joint compound 630 to go through the nozzle portion 2115 in reverse helping clear out clogs.

In various embodiments, nozzle or blade wear models can also take as an input the type and characteristics of joint compound 630 applied and the conditions under which such compound 630 was applied. One or more vision system 364, 324 of the system 100 can be used to detect finish, tool pattern and establish if the nozzle 1240 or blade 1130 needs to be changed, rotated, cleaned or otherwise modified. A user interface can display the wear on the nozzle 1240 or blade 1130 and alert the user when these need to be changed. A mudding end effector 160M can also include a mechanism to automatically replace or clean the nozzle 1240 or portions thereof. One embodiment (e.g., FIG. 20) can use a cassette with replacement nozzles 1240 that can be rotated into place. The sprayer 1210 can also have a mechanism 2105 to rotate the nozzle or portion thereof (e.g. a tip or feeding tube) to clear a clog (e.g., FIG. 21). The nozzle clearing or replacement can be run automatically by the system 100 without any human intervention or as a collaboration between the system 100 and the user.

The system 100 can generate reports and interface with other software platforms including BIM packages. Reports can be created that can be used for inspection and certification. A report can be customized to provide the information required to pass a standard, test, or certification. The reporting system can also provide a live update of the current task progress and live camera feed. This information can be used to help track asset performance and work progression. The data can be reported to a BIM system or other software to facilitate planning of other trades, next steps, or schedule inspections or other tasks. The reports can include full maps of the joint compound 630 applied and tool and path parameters utilized to complete the task. Further images or video can be recorded to facilitate quality checks or for tracking of issues. The system 100 can record parameters used to complete the task which can be fed to a machine learning software to enable the system 100 to learn from past work. The reports can also be used to optimize workflow and scheduling. The system's optimization function can be updated to meet the desired needs including minimizing task time, completion of the task in a part of the worksite to allow other trades to come in, minimizing cost, optimal use of assets and workforce, among others. The system's reports can also include information on environmental conditions and how the process was changed given the conditions.

The system 100 can create a report that shows the process parameters that were used to cover the surface as well as the order of operations. The report can include BIM, 3D and 2D maps or plans, images, video. The maps provided by the system 100 can be used to facilitate repairs and maintenance by providing the customer with the location of components behind the wall as well as the location of seams to facilitate the removal of panels or boards.

The updated room models that reflect the as built conditions and measurements can be exported for use in sanding the walls or for certification of quality at delivery. A complete map of the thickness of the compound applied with or without shrinking can be fed into the system 100 or a separate automated sanding system which can plan tool paths and parameters desired to achieve the desired finish by sanding. The system 100 can work in conjunction with a larger system that plans the full process from mapping a room, to cutting and hanging the drywall to finishing and painting of the surfaces. This system 100 can be used for coating surfaces with any suitable material, including but not limited to joint compound 630, plaster, stucco, cement, paint, polymer coating, lacquers, varnishes, or any combination of these. The system 100 can apply the coatings on any suitable substrate, including but not limited to drywall, boards, lath, mesh, or other substrates. The system 100 can also be used to apply other coverings such as wallpaper, polymer films, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywalling system for applying joint compound to drywall of a wall assembly, the automated drywalling system comprising:
    a base unit that includes:
        a mud source configured to store joint compound or plaster;
        a platform,
        a cart configured to be disposed on and move on the ground, and
        a lift disposed between the platform and cart, the lift configured to raise the platform up and down;
    an elongated robotic arm that extends between a base end and a distal end, the robotic arm coupled to the base unit on the platform at the base end of the robotic arm;
    a mudding end effector coupled at the distal end of the robotic arm, the mudding end effector including a spray gun configured to generate a spray of joint compound or plaster from a nozzle of the spray gun, the spray gun coupled with a mud tube extending from the mud source via the robotic arm, the spray gun configured to receive joint compound or plaster from the mud source via the mud tube to generate the spray of joint compound or plaster;
    one or more vision systems;
    one or more sensors;
    a computing device executing a computational planner that:
        obtains target surface data from the one or more vision systems and the one or more sensors, the target surface data including information regarding a configuration of a wall assembly including a plurality of drywall pieces disposed on the wall assembly forming one or more joints between respective drywall pieces;
        automatically generates, instructions for driving the mudding end effector, robotic arm, and base unit to perform at least one mudding task that includes applying a joint compound spray generated by the spray gun of the mudding end effector to at least the one or more joints between the respective drywall pieces, the generating based at least in part on the target surface data, wherein the computational planner further automatically generates the instructions for driving the mudding end effector, robotic arm, and base unit to perform the at least one mudding task based on a requirement for a level of drywall finish; and
        automatically drives, the mudding end effector, robotic arm, and base unit to perform the at least one mudding task.

2. The automated drywalling system of claim 1, wherein the computational planner further automatically generates, instructions for driving the mudding end effector, robotic arm, and base unit to apply joint tape to the one or more joints between the respective drywall pieces;
    system uses features detected by the vision system to determine the amount of mud and profile of the mud to be applied at the feature.

3. The automated drywalling system of claim 1, wherein the mudding end effector further comprises a vacuum hood disposed around an end and the nozzle of the spray gun to capture overspray generated by the spray of joint compound or plaster generated by the nozzle of the spray gun.

4. The automated drywalling system of claim 1, wherein the generating instructions for driving the mudding end effector, robotic arm, and base unit to apply joint compound to the one or more joints between the respective drywall pieces, is further based on data obtained while the automated drywalling system was hanging the drywall pieces on the wall assembly.

5. An automated drywalling system comprising:
    a base unit;
    an elongated robotic arm that extends between a base end and a distal end, the robotic arm coupled to the base unit at the base end of the robotic arm;
    a mudding end effector coupled at the distal end of the robotic arm, the mudding end effector configured to apply joint compound or plaster to a target surface;
    one or more vision systems; and
    a computing device executing a computational planner that:
        obtains target surface data from the one or more vision systems, the target surface data including information regarding a configuration of a wall assembly including a plurality of drywall pieces disposed on the wall assembly forming one or more joints between respective drywall pieces;

automatically generates, instructions for driving the mudding end effector, robotic arm, and base unit to perform at least one mudding task that includes applying joint compound or plaster, via the mudding the end effector, to at least the one or more joints between the respective drywall pieces, the generating based at least in part on the target surface data, wherein the computational planner further automatically generates the instructions for driving the mudding end effector, robotic arm, and base unit to perform the at least one mudding task based on a requirement for a level of drywall finish; and automatically drives, the end effector, robotic arm, and base unit to perform the at least one mudding task.

6. The automated drywalling system of claim 5, wherein the mudding end effector applies joint compound or plaster to a target surface via at least one of a spray gun and a drywall flat box.

7. The automated drywalling system of claim 5, wherein the computational planner further automatically generates, instructions for driving the mudding end effector, robotic arm, and base unit to apply joint tape to the one or more joints between the respective drywall pieces.

8. The automated drywalling system of claim 7, wherein the computational planner further automatically generates, instructions for driving the mudding end effector, robotic arm, and base unit to run a blade over joint tape and joint compound applied at the one or more joints between the respective drywall pieces.

9. The automated drywalling system of claim 5, wherein the mudding end effector comprises a spray guard that at least partially extends about and past a nozzle of a spray gun of the mudding end effector.

10. The automated drywalling system of claim 5, wherein the mudding end effector further includes a guiding element configured to engage the target surface or adjacent portion of a wall assembly to guide the mudding end effector in mudding the target surface.

11. The automated drywalling system of claim 5, wherein the generating instructions for driving the mudding end effector, robotic arm, and base unit to apply joint compound to the one or more joints between the respective drywall pieces, is further based on data obtained while the automated drywalling system was hanging the drywall pieces on the wall assembly.

12. An automated drywalling system comprising:
a robotic arm that extends between a base end and a distal end;
a mudding end effector coupled at the distal end of a positioning stage, the mudding end effector configured to apply joint compound or plaster to a target surface;
a computing device executing a computational planner that:
generates instructions for driving the mudding end effector and positioning stage to perform at least one mudding task that includes applying joint compound or plaster, via the mudding the end effector, to one or more joints between a plurality of drywall pieces, the generating based at least in part on obtained target surface data, wherein the computational planner further generates the instructions for driving the mudding end effector and positioning stage to perform the at least one mudding task based on a requirement for a level of drywall finish; and drives the end effector and positioning stage to perform the at least one mudding task.

13. The automated drywalling system of claim 12, wherein the computational planner further automatically determines an amount of joint compound to apply to the one or more joints based on the target surface data and determines a joint compound profile for joint compound to be applied to the one or more joints based on the target surface data, and wherein the computational planner further generates, the instructions for driving the mudding end effector, robotic arm, and base unit to apply joint compound to the one or more joints between the respective drywall pieces based at least in part on the determined amount of joint compound to apply and the determined joint compound profile.

14. The automated drywalling system of claim 12, wherein the mudding end effector further comprises a blower, wherein the blower is configured to apply heat and/or dry air to joint compound that has been applied by the mudding end effector.

15. The automated drywalling system of claim 12, wherein the computational planner obtains at least a portion of the target surface data from one or more vision systems, the target surface data including information regarding a configuration of the plurality of drywall pieces and the one or more joints between respective drywall pieces.

16. The automated drywalling system of claim 12, wherein the generating instructions for driving the mudding end effector and positioning stage to apply joint compound to the one or more joints between the respective drywall pieces, is further based on data obtained while the automated drywalling system was hanging the drywall pieces.

17. The automated drywalling system of claim 12, wherein the automated drywalling system further comprises a mixing system for the mixing joint compound or plaster and providing the joint compound or plaster to the mudding end effector, and
wherein the computational planner changes mixing parameters of the joint compound or plaster generated by the mixing system based on environmental condition data obtained from one or more sensors of the automated drywalling system.

18. The automated drywalling system of claim 12, wherein the mudding end effector applies joint compound or plaster to a target surface via at least one of a spray gun and a drywall flat box.

19. The automated drywalling system of claim 12, wherein the computational planner further generates instructions for driving the mudding end effector and positioning stage to apply joint tape to the one or more joints between the respective drywall pieces.

20. The automated drywalling system of claim 12, wherein the computational planner further automatically generates instructions for driving the mudding end effector and positioning stage to apply joint tape to the one or more joints between the respective drywall pieces, wherein joint tape or joint compound of different colors is applied to different joints for detection by one or more vision systems of the automated drywalling system to indicate a difference in joints.

21. The automated drywalling system of claim 1, wherein the computational planner further automatically generates the instructions to perform the at least one mudding task including instructions for real-time automatic adjustments of the amount of the joint compound being applied based on the requirement for the level of drywall finish.

22. The automated drywalling system of claim 1, wherein the computational planner further automatically generates the instructions to perform the at least one mudding task including instructions for real-time updating of the tool paths and/or tool parameters for improving the finish level of joint compound being applied based on the requirement for the level of drywall finish.

23. The automated drywalling system of claim 1, wherein the computational planner further automatically generates the instructions for driving the mudding end effector, robotic arm, and base unit to perform the at least one mudding task that includes following a path defined by the one or more joints between the respective drywall pieces, to apply the joint compound spray generated by the spray gun of the mudding end effector to the one or more joints between the respective drywall pieces.

* * * * *

UNITED STATES PATENT AND TRADEMARK OFFICE
CERTIFICATE OF CORRECTION

PATENT NO. : 10,822,814 B2
APPLICATION NO. : 15/941886
DATED : November 3, 2020
INVENTOR(S) : Maria J. Telleria et al.

It is certified that error appears in the above-identified patent and that said Letters Patent is hereby corrected as shown below:

In the Claims

Column 27, Line 50, cancel the text beginning with "1. An automated drywalling" to and ending "one mudding task." in Column 28, Line 32 and insert the following claim:
--1. An automated drywalling system for applying joint compound to drywall of a wall assembly, the automated drywalling system comprising:
    a base unit that includes:
        a mud source configured to store joint compound or plaster;
        a platform,
        a cart configured to be disposed on and move on the ground, and
        a lift disposed between the platform and the cart, the lift configured to raise the platform up and down;
    an elongated robotic arm that extends between a base end and a distal end, the robotic arm coupled to the base unit on the platform at the base end of the robotic arm;
    a mudding end effector coupled at the distal end of the robotic arm, the mudding end effector including a spray gun configured to generate a spray of the joint compound or the plaster from a nozzle of the spray gun, the spray gun coupled with a mud tube extending from the mud source via the robotic arm, the spray gun configured to receive the joint compound or the plaster from the mud source via the mud tube to generate the spray of the joint compound or the plaster;
    one or more vision systems;
    one or more sensors; and
    a computing device executing a computational planner that:
        obtains target surface data from the one or more vision systems and the one or more sensors, the target surface data including information regarding a configuration of a wall assembly including a plurality of drywall pieces disposed on the wall assembly forming one or more joints between respective drywall pieces;
        automatically generates instructions for driving the mudding end effector, the robotic arm, and the base unit to perform at least one mudding task that includes applying the spray of the joint compound generated by the spray gun of the mudding end effector to at least the one or more joints between the respective drywall pieces, the generating based at least in part on the target surface Signed and Sealed this
Tenth Day of January, 2023

Katherine Kelly Vidal
*Director of the United States Patent and Trademark Office* data, wherein the computational planner further automatically generates the instructions for driving the mudding end effector, the robotic arm, and the base unit to perform the at least one mudding task based on a requirement for a level of drywall finish; and automatically drives the mudding end effector, the robotic arm, and the base unit to perform the at least one mudding task.--

Column 28, Line 33, cancel the text beginning with "2. The automated drywalling" to and ending "at the feature." in Column 28, Line 40 and insert the following claim:
--2. The automated drywalling system of claim 1, wherein the computational planner further automatically generates, instructions for driving the mudding end effector, the robotic arm, and the base unit to apply joint tape to the one or more joints between the respective drywall pieces;
and wherein the automated drywalling system uses features detected by the one or more vision systems to determine an amount of mud and a profile of the mud to be applied at the features.--

Column 28, Line 41, cancel the text beginning with "3. The automated drywalling" to and ending "the spray gun." in Column 28, Line 45 and insert the following claim:
--3. The automated drywalling system of claim 1, wherein the mudding end effector further comprises a vacuum hood disposed around an end and the nozzle of the spray gun to capture overspray generated by the spray of the joint compound or the plaster generated by the nozzle of the spray gun.--

Column 28, Line 46, cancel the text beginning with "4. The automated drywalling" to and ending "the wall assembly." in Column 28, Line 52 and insert the following claim:
--4. The automated drywalling system of claim 1, wherein the generating instructions for driving the mudding end effector, the robotic arm, and the base unit to apply the joint compound to the one or more joints between the respective drywall pieces, is further based on data obtained while the automated drywalling system was hanging the drywall pieces on the wall assembly.--

Column 28, Line 53, cancel the text beginning with "5. An automated drywalling" to and ending "one mudding task." in Column 29, Line 17 and insert the following claim:
--5. An automated drywalling system comprising:
a base unit;
an elongated robotic arm that extends between a base end and a distal end, the robotic arm coupled to the base unit at the base end of the robotic arm;
a mudding end effector coupled at the distal end of the robotic arm, the mudding end effector configured to apply joint compound or plaster to a target surface;
one or more vision systems; and
a computing device executing a computational planner that:
obtains target surface data from the one or more vision systems, the target surface data including information regarding a configuration of a wall assembly including a plurality of drywall pieces disposed on the wall assembly forming one or more joints between respective drywall pieces;
automatically generates instructions for driving the mudding end effector, the robotic arm, and the base unit to perform at least one mudding task that includes applying the joint compound or the plaster, via the mudding end effector, to at least the one or more joints between the respective drywall pieces, the generating based at least in part on the target surface data, wherein the computational planner further automatically generates the instructions for driving the mudding end effector, the robotic arm, and the base unit to perform the at least one mudding task based on a requirement for a level of drywall finish; and automatically drives the mudding end effector, the robotic arm, and the base unit to perform the at least one mudding task.--

Column 29, Line 18, cancel the text beginning with "6. The automated drywalling" to and ending "drywall flat box." in Column 29, Line 21 and insert the following claim:
--6. The automated drywalling system of claim 5, wherein the mudding end effector applies the joint compound or the plaster to the target surface via at least one of a spray gun and a drywall flat box.--

Column 29, Line 22, cancel the text beginning with "7. The automated drywalling" to and ending "respective drywall pieces." in Column 29, Line 26 and insert the following claim:
--7. The automated drywalling system of claim 5, wherein the computational planner further automatically generates, instructions for driving the mudding end effector, the robotic arm, and the base unit to apply joint tape to the one or more joints between the respective drywall pieces.--

Column 29, Line 27, cancel the text beginning with "8. The automated drywalling" to and ending "respective drywall pieces." in Column 29, Line 32 and insert the following claim:
--8. The automated drywalling system of claim 7, wherein the computational planner further automatically generates, instructions for driving the mudding end effector, the robotic arm, and the base unit to run a blade over the joint tape and the joint compound applied at the one or more joints between the respective drywall pieces.--

Column 29, Line 37, cancel the text beginning with "10. The automated drywalling" to and ending "the target surface." in Column 29, Line 41 and insert the following claim:
--10. The automated drywalling system of claim 5, wherein the mudding end effector further includes a guiding element configured to engage the target surface or adjacent portion of the wall assembly to guide the mudding end effector in mudding the target surface.--

Column 29, Line 42, cancel the text beginning with "11. The automated drywalling" to and ending "the wall assembly." in Column 29, Line 48 and insert the following claim:
--11. The automated drywalling system of claim 5, wherein the generating instructions for driving the mudding end effector, the robotic arm, and the base unit to apply the joint compound to the one or more joints between the respective drywall pieces, is further based on data obtained while the automated drywalling system was hanging the drywall pieces on the wall assembly.--

Column 29, Line 49, cancel the text beginning with "12. An automated drywalling" to and ending "one mudding task." in Column 30, Line 2 and insert the following claim:
--12. An automated drywalling system comprising:
    a robotic arm that extends between a base end and a distal end;
    a mudding end effector coupled at a distal end of a positioning stage, the mudding end effector configured to apply joint compound or plaster to a target surface; and
    a computing device executing a computational planner that:
        generates instructions for driving the mudding end effector and positioning stage to perform at least one mudding task that includes applying the joint compound or the plaster, via the mudding end effector, to one or more joints between a plurality of drywall pieces, the generating based at least in part on obtained target surface data, wherein the computational planner further generates the instructions for driving the mudding end effector and the positioning stage to perform the at least one mudding task based on a requirement for a level of drywall finish; and drives the mudding end effector and the positioning stage to perform the at least one mudding task.--

Column 30, Line 3, cancel the text beginning with "13. The automated drywalling" to and ending "joint compound profile." in Column 30, Line 15 and insert the following claim:
--13. The automated drywalling system of claim 12, wherein the computational planner further automatically determines an amount of the joint compound to apply to the one or more joints based on the target surface data and determines a joint compound profile for the joint compound to be applied to the one or more joints based on the target surface data, and wherein the computational planner further generates the instructions for driving the mudding end effector, the robotic arm, and a base unit to apply the joint compound to the one or more joints between the respective drywall pieces based at least in part on the determined amount of the joint compound to apply and the determined joint compound profile.--

Column 30, Line 16, cancel the text beginning with "14. The automated drywalling" to and ending "mudding end effector." in Column 30, Line 21 and insert the following claim:
--14. The automated drywalling system of claim 12, wherein the mudding end effector further comprises a blower, wherein the blower is configured to apply heat and/or dry air to the joint compound that has been applied by the mudding end effector.--

Column 30, Line 28, cancel the text beginning with "16. The automated drywalling" to and ending "the drywall pieces." in Column 30, Line 33 and insert the following claim:
--16. The automated drywalling system of claim 12, wherein the generating instructions for driving the mudding end effector and the positioning stage to apply the joint compound to the one or more joints between the respective drywall pieces, is further based on data obtained while the automated drywalling system was hanging the drywall pieces.--

Column 30, Line 34, cancel the text beginning with "17. The automated drywalling" to and ending "automated drywalling system." in Column 30, Line 43 and insert the following claim:
--17. The automated drywalling system of claim 12, wherein the automated drywalling system further comprises a mixing system for mixing the joint compound or the plaster and providing the joint compound or the plaster to the mudding end effector, and wherein the computational planner changes mixing parameters of the joint compound or the plaster generated by the mixing system based on environmental condition data obtained from one or more sensors of the automated drywalling system.--

Column 30, Line 44, cancel the text beginning with "18. The automated drywalling" to and ending "drywall flat box." in Column 30, Line 47 and insert the following claim:
--18. The automated drywalling system of claim 12, wherein the mudding end effector applies the joint compound or the plaster to the target surface via at least one of a spray gun and a drywall flat box.--

CERTIFICATE OF CORRECTION (continued)
U.S. Pat. No. 10,822,814 B2

Column 30, Line 48, cancel the text beginning with "19. The automated drywalling" to and ending "respective drywall pieces." in Column 30, Line 52 and insert the following claim:
--19. The automated drywalling system of claim 12, wherein the computational planner further generates instructions for driving the mudding end effector and the positioning stage to apply joint tape to the one or more joints between the respective drywall pieces.--

Column 30, Line 53, cancel the text beginning with "20. The automated drywalling" to and ending "difference in joints." in Column 30, Line 61 and insert the following claim:
--20. The automated drywalling system of claim 12, wherein the computational planner further automatically generates instructions for driving the mudding end effector and the positioning stage to apply joint tape to the one or more joints between the respective drywall pieces, wherein the joint tape or the joint compound of different colors is applied to different joints for detection by one or more vision systems of the automated drywalling system to indicate a difference in joints.--

Column 30, Line 62, cancel the text beginning with "21. The automated drywalling" to and ending "of drywall finish." in Column 30, Line 67 and insert the following claim:
--21. The automated drywalling system of claim 1, wherein the computational planner further automatically generates the instructions to perform the at least one mudding task including instructions for real-time automatic adjustments of an amount of the joint compound being applied based on the requirement for the level of drywall finish.--

Column 31, Line 1, cancel the text beginning with "22. The automated drywalling" to and ending "of drywall finish." in Column 31, Line 7 and insert the following claim:
--22. The automated drywalling system of claim 1, wherein the computational planner further automatically generates the instructions to perform the at least one mudding task including instructions for real-time updating of tool paths and/or tool parameters for improving a finish level of the joint compound being applied based on a requirement for the level of drywall finish.--

Column 31, Line 8, cancel the text beginning with "23. The automated drywalling" to and ending "orespective drywall pieces." in Column 31, Line 16 and insert the following claim:
--23. The automated drywalling system of claim 1, wherein the computational planner further automatically generates the instructions for driving the mudding end effector, the robotic arm, and the base unit to perform the at least one mudding task that includes following a path defined by the one or more joints between the respective drywall pieces, to apply the spray of the joint compound generated by the spray gun of the mudding end effector to the one or more joints between the respective drywall pieces.--